US010600229B2

United States Patent
Hakura et al.

(10) Patent No.: US 10,600,229 B2
(45) Date of Patent: Mar. 24, 2020

(54) TECHNIQUES FOR REPRESENTING AND PROCESSING GEOMETRY WITHIN A GRAPHICS PROCESSING PIPELINE

(71) Applicant: NVIDIA Corporation, Santa Clara, CA (US)

(72) Inventors: Ziyad Hakura, San Jose, CA (US);
Yury Uralsky, San Jose, CA (US);
Christoph Kubisch, Aachen (DE);
Pierre Boudier, Los Gatos, CA (US);
Henry Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 15/881,564

(22) Filed: Jan. 26, 2018

(65) Prior Publication Data
US 2019/0236827 A1    Aug. 1, 2019

(51) Int. Cl.
*G06T 15/00* (2011.01)
*G06T 17/20* (2006.01)
(Continued)

(52) U.S. Cl.
CPC ............ *G06T 15/005* (2013.01); *G06T 15/04* (2013.01); *G06T 15/80* (2013.01); *G06T 17/10* (2013.01); *G06T 17/20* (2013.01)

(58) Field of Classification Search
CPC ....... G06T 15/00; G06T 15/005; G06T 15/04; G06T 15/80; G06T 17/20; G06T 17/10; G06F 9/4881; G06F 2209/484
(Continued)

(56) References Cited

U.S. PATENT DOCUMENTS 7,339,590 B1 * 3/2008 Moskal ............... G06T 1/60
345/501
7,539,988 B1 * 5/2009 Hersh ............... G06F 9/466
718/100
(Continued)

OTHER PUBLICATIONS

Schwarz M, Stamminger M. Fast GPU-based adaptive tessellation with CUDA. InComputer Graphics Forum Apr. 2009 (vol. 28, No. 2, pp. 365-374). Oxford, UK: Blackwell Publishing Ltd.*
(Continued)

*Primary Examiner* — Phu K Nguyen
(74) *Attorney, Agent, or Firm* — Artegis Law Group, LLP

(57) ABSTRACT

In various embodiments, a parallel processor implements a graphics processing pipeline that generates rendered images via a shading program. In operation, the parallel processor causes a first set of execution threads to execute the shading program on a first portion of the input mesh to generate first geometry stored in an on-chip memory. The parallel processor also causes a second set of execution threads to execute the mesh shading program on a second portion of the input mesh to generate second geometry stored in the on-chip memory. Subsequently, the parallel processor reads the first geometry and the second geometry from the on-chip memory, and performs operations on the first geometry and the second geometry to generate a rendered image derived from the input mesh. Advantageously, unlike conventional graphics processing pipelines, the performance of the graphics processing pipeline is not limited by a primitive distributor.

23 Claims, 14 Drawing Sheets

(51) Int. Cl.
*G06T 15/04* (2011.01)
*G06T 17/10* (2006.01)
*G06T 15/80* (2011.01)

(58) Field of Classification Search
USPC .......................................................... 345/419
See application file for complete search history.

(56) References Cited

U.S. PATENT DOCUMENTS

| | | | |
|---|---|---|---|
| 8,558,842 | B1 | 10/2013 | Johnson et al. |
| 8,982,124 | B2 * | 3/2015 | Li .................... G06T 15/60 345/426 |
| 9,286,119 | B2 * | 3/2016 | Sevastiyanov ........ G06F 9/4881 |
| 9,799,087 | B2 * | 10/2017 | Fam ........................ G06T 1/20 |
| 9,928,642 | B2 * | 3/2018 | Diard .................... G06T 15/005 |
| 2004/0252711 | A1 | 12/2004 | Romano et al. |
| 2014/0184606 | A1 | 7/2014 | De Richebourg et al. |
| 2015/0145880 | A1 | 5/2015 | Smith et al. |
| 2015/0379661 | A1 | 12/2015 | Surti et al. |
| 2016/0203073 | A1 | 7/2016 | Eisen et al. |
| 2017/0262954 | A1 | 9/2017 | Arntzen |
| 2018/0144536 | A1 | 5/2018 | Arrabi et al. |
| 2018/0158227 | A1 | 6/2018 | Reshetov et al. |
| 2018/0232912 | A1 | 8/2018 | Nevraev et al. |

OTHER PUBLICATIONS

Dang HV, Seo S, Amer A, Balaji P. Advanced thread synchronization for multithreaded MPI implementations. InCluster, Cloud and Grid Computing (CCGRID), 2017 17th IEEE/ACM International Symposium on May 14, 2017 (pp. 314-324). IEEE.*

Padro Xavier, Java Concurrency Tutorial—Visibility between threads, Aug. 2014, pp. 1-4.*

* cited by examiner

TECHNIQUES FOR REPRESENTING AND PROCESSING GEOMETRY WITHIN A GRAPHICS PROCESSING PIPELINE

BACKGROUND OF THE INVENTION

Field of the Invention

Embodiments of the present invention relate generally to graphics processing and, more specifically, to techniques for representing and processing geometry within a graphics processing pipeline.

Description of the Related Art

A conventional graphics processing pipeline typically includes a single fixed-function hardware unit known as the primitive distributor. The primitive distributor collects vertex data associated with high-order surfaces, graphics primitives, and the like, from a front end unit and constructs corresponding batches of work, where each batch of work includes vertex data that defines multiple primitives. The batches of work are then processed by programmable execution units also included in the graphics processing pipeline. During execution, the batches of work are distributed across a set of streaming multiprocessors that are configured to execute a large number of threads in parallel to perform graphics operations on the vertex data based on a programming model. Oftentimes, according to the programming, each vertex included in a given batch of work is independently processed by a different thread.

One limitation of conventional graphics processing pipelines is that the throughput of the graphics processing pipeline is limited by the throughput of the primitive distributor. More particularly, the primitive distributor typically is a fixed-function hardware unit having a fixed throughput and limited scalability. Consequently, as the memory bandwidth and number of streaming multiprocessors increase, the primitive distributor limits the overall performance of the graphics processing pipeline. For example, if the primitive distributor has a throughput of 16 primitives per clock cycle, then the overall throughput of the graphics processing pipeline is limited to 16 primitives per clock cycle irrespective of the memory bandwidth and/or the number of streaming multiprocessors supporting the graphics pipeline.

Another limitation of conventional graphics processing pipelines is that the applicable programming model is inflexible. Among other things, the programming model does not allow applications to execute certain operations earlier in the pipeline to make overall execution more efficient. For example, as noted above, the programming model oftentimes enforces a one-to-one correspondence between the vertices and the threads, where each vertex included in a batch of work is independently processed by a different thread. Because a given thread processes a given vertex independently of the vertices being processed by other threads, there is no good way to program the vertex processing unit to perform culling operations to discard non-visible primitives at the vertex processing stage of the graphics processing pipeline. For instance, a thread that is processing a single vertex included in a given triangle primitive is unable to determine whether the triangle primitive is visible in a final image because two other vertices being processed by two other threads need to be involved in that determination. Because the vertex processing unit cannot be programmed to cull non-visible primitives, downstream units in the graphics processing pipeline end up performing unnecessary graphics operations on those non-visible primitives, thus wasting both processing resources and power.

As the foregoing illustrates, what is needed in the art are more effective techniques for processing image data.

SUMMARY OF THE INVENTION

One embodiment of the present invention sets forth a method for processing image data. The method includes causing a first set of execution threads to execute a shading program on a first set of vertices included in a first portion of an input mesh to generate first geometry; causing a second set of execution threads to execute the shading program on a second set of vertices included in a second portion of the input mesh to generate second geometry; storing the first geometry and the second geometry in an on-chip memory; subsequently reading the first geometry and the second geometry from the on-chip memory; and performing one or more operations on the first geometry and the second geometry to generate a rendered image derived from the input mesh.

One advantage of the disclosed techniques is that a graphics processing pipeline may implement the techniques instead of implementing a primitive distributor, vertex processing units, and geometry shading units. As a result, the performance of the graphics processing pipeline is not limited by the fixed throughput of the primitive distributor. Further, because multiple cooperative threads execute the shading program, the graphics processing pipeline may perform certain operations earlier and more efficiently relative to a conventional graphics processing pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
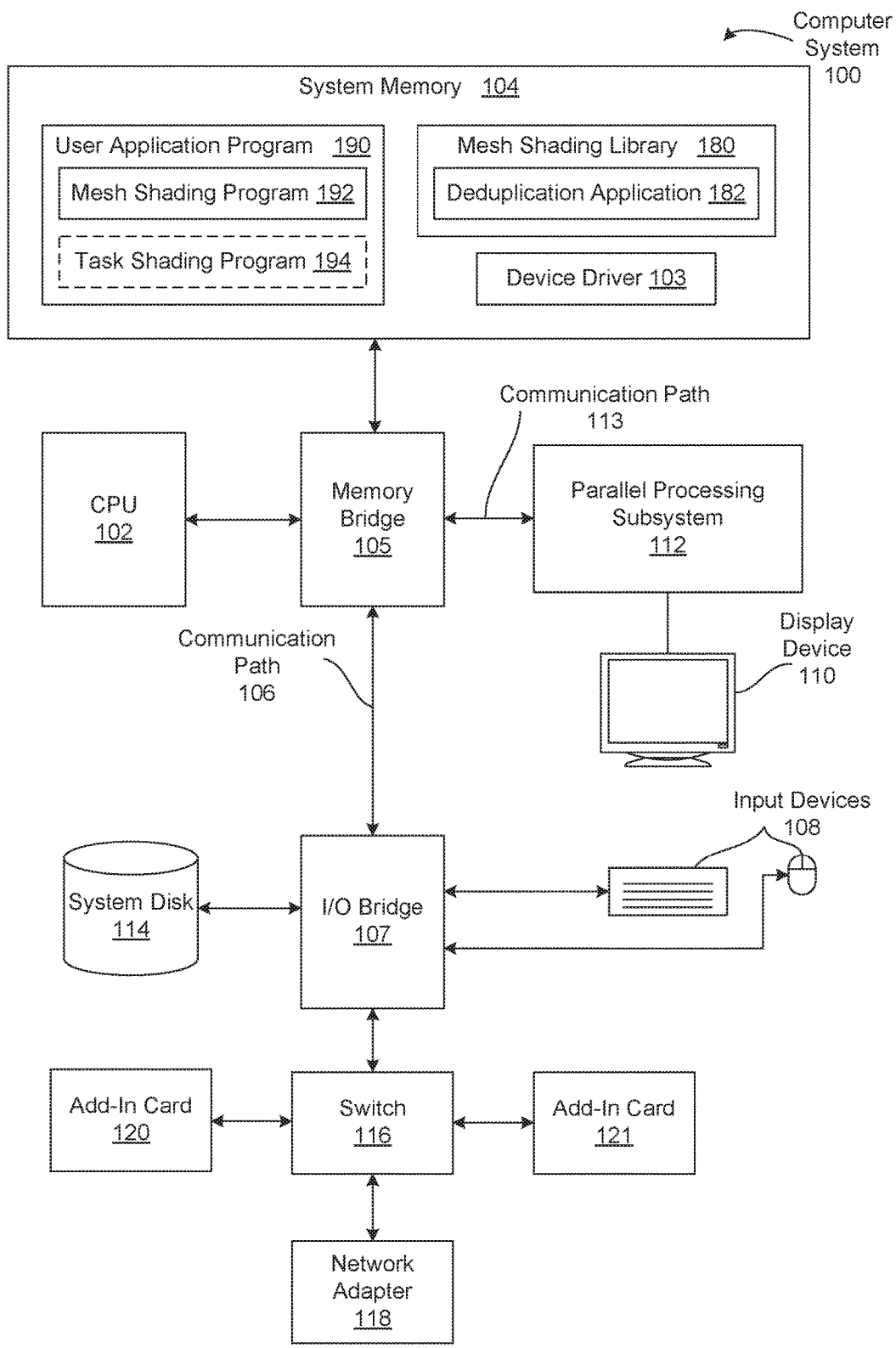
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. In some embodiments, the computer system 100 is a game console. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processors (PPs) included within parallel processing subsystem 112. In other embodiments, the parallel processing subsystem 112 incorporates circuitry optimized for general purpose and/or compute processing. Again, such circuitry may be incorporated across one or more PPs included within parallel processing subsystem 112 that are configured to perform such general purpose and/or compute operations. In yet other embodiments, the one or more PPs included within parallel processing subsystem 112 may be configured to perform graphics processing, general purpose processing, and compute processing operations. System memory 104 includes at least one device driver 103 configured to manage the processing operations of the one or more PPs within parallel processing subsystem 112.

As shown, the system memory 104 includes, without limitation, the device driver 103, the user application program 190, and a mesh shading library 180. The user application program 190 includes, without limitation, a mesh shading program 192 and a task shading program 194. As described in conjunction with FIGS. 3-8B, in various embodiments, the mesh shading program 192 and/or the task shading program 194 execute on the one or more PPs as part of a graphics processing pipeline (not shown in FIG. 1). In general, the mesh shading library 180 includes any number of applications that the mesh shading program 192 may execute. As shown, the mesh shading library 180 includes, without limitation, a deduplication application 182. The deduplication application 182 is described in conjunction with FIGS. 9-10.

In various embodiments, the user application program 190 may include any number (including 0) of each of the mesh shading program 192 and the task shading program 194. For example, the user application program 190 could include the mesh shading program 192 and not include the task shading program 194. In the same or other embodiments, the computer system 100 may omit the mesh shading library 180, or the mesh shading library 180 may omit the deduplication application 182.

In alternate embodiments, the system memory 104 may include any number (including 0) of each of the device driver 103, the user application program 190, and the meshlet library 180. Further, any number of the device driver 103, the user application program 190, and the mesh shading library 180 may be stored in any number and type of external memories that are accessible to the processor 112. For example, and without limitation, the external memories may include a Secure Digital Card, an external Flash memory, a portable compact disc read-only memory (CD-ROM), an optical storage device, a magnetic storage device, or any suitable combination of the foregoing. Further, the external memories may be implemented in a cloud or any other type of distributed system.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
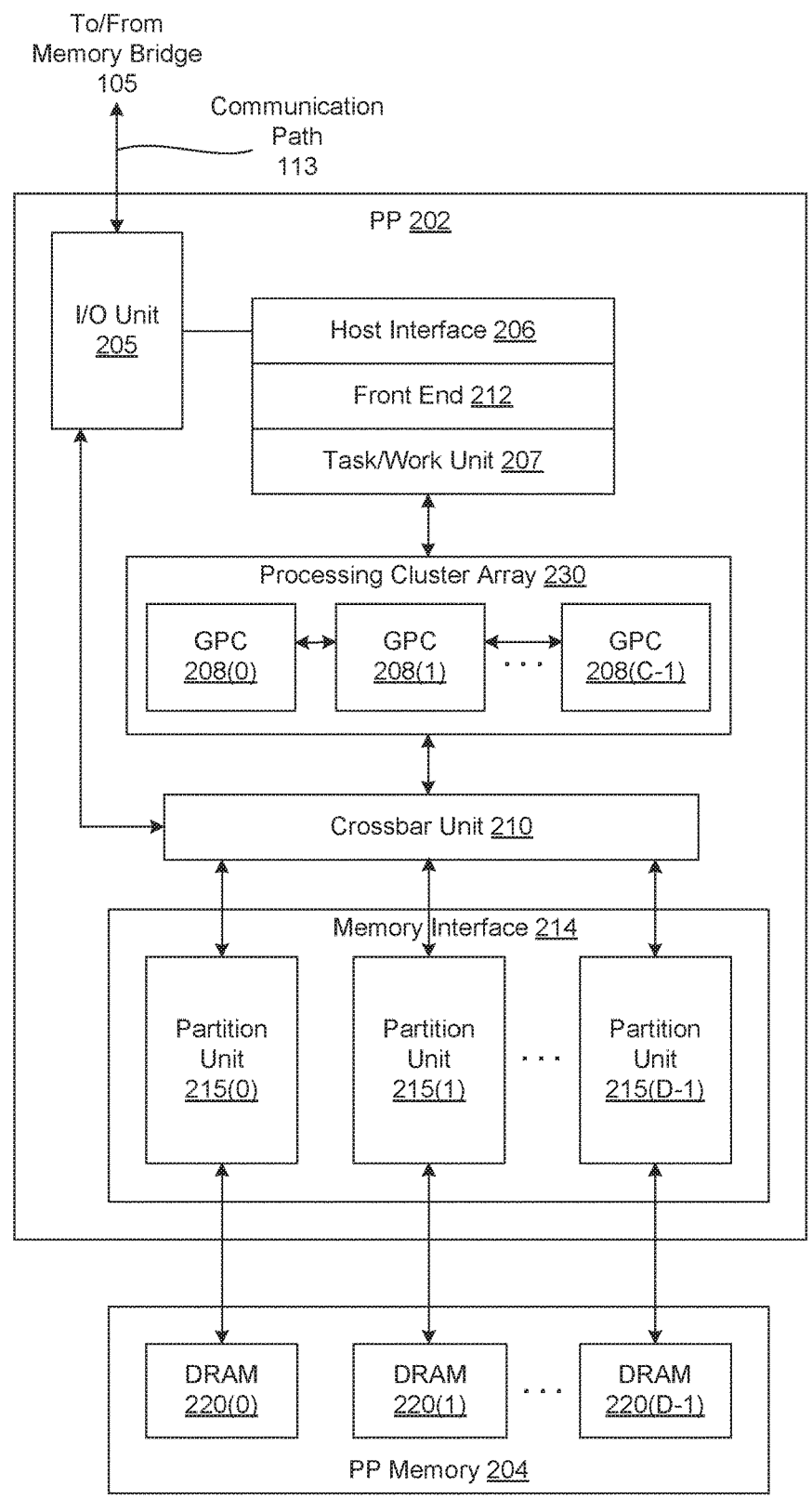
FIG. 2 is a more detailed block diagram of a parallel processor included in the parallel processing subsystem of FIG. 1, according to various embodiments of the present invention.

FIG. 2 is a more detailed block diagram of a parallel processor 202 included in the parallel processing subsystem 112 of FIG. 1, according to various embodiments of the present invention. Although FIG. 2 depicts one PP 202, as indicated above, parallel processing subsystem 112 may include any number of PPs 202. As shown, PP 202 is coupled to a local parallel processing (PP) memory 204. PP 202 and PP memory 204 may be implemented using one or more integrated circuit devices, such as programmable processors, application specific integrated circuits (ASICs), or memory devices, or in any other technically feasible fashion.

In some embodiments, PP 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PP 202 also may be configured for general-purpose processing and compute operations.

In operation, CPU 102 is the master processor of computer system 100, controlling and coordinating operations of other system components. In particular, CPU 102 issues commands that control the operation of PP 202. In some embodiments, CPU 102 writes a stream of commands for PP 202 to a data structure (not explicitly shown in either FIG. 1 or FIG. 2) that may be located in system memory 104, PP memory 204, or another storage location accessible to both CPU 102 and PP 202. A pointer to the data structure is written to a pushbuffer to initiate processing of the stream of commands in the data structure. The PP 202 reads command streams from the pushbuffer and then executes commands asynchronously relative to the operation of CPU 102. In embodiments where multiple pushbuffers are generated, execution priorities may be specified for each pushbuffer by an application program 190 via device driver 103 to control scheduling of the different pushbuffers.

As also shown, PP 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PP 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PP 202 to the rest of computer system 100 may be varied. In some embodiments, parallel processing subsystem 112, which includes at least one PP 202, is implemented as an add-in card that can be inserted into an expansion slot of computer system 100. In other embodiments, PP 202 can be integrated on a single chip with a bus bridge, such as memory bridge 105 or I/O bridge 107. Again, in still other embodiments, some or all of the elements of PP 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PP 202 advantageously implements a highly parallel processing architecture based on a processing cluster array 230 that includes a set of C general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D 1. As shown, each of the partition units 215 includes, without limitation, a level 2 (L2) cache 260. Each of the L2 caches 260 includes any number of L2 slices 270. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PP 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shading programs), general compute operations, etc. In operation, PP 202 is configured to transfer data from system memory 104 and/or PP memory 204 to one or more on-chip memory units, process the data, and write result data back to system memory 104 and/or PP memory 204. The result data may then be accessed by other system components, including CPU 102, another PP 202 within parallel processing subsystem 112, or another parallel processing subsystem 112 within computer system 100.

As noted above, any number of PPs 202 may be included in a parallel processing subsystem 112. For example, multiple PPs 202 may be provided on a single add-in card, or multiple add-in cards may be connected to communication path 113, or one or more of PPs 202 may be integrated into a bridge chip. PPs 202 in a multi-PP system may be identical to or different from one another. For example, different PPs 202 might have different numbers of processing cores and/or different amounts of PP memory 204. In implementations where multiple PPs 202 are present, those PPs may be operated in parallel to process data at a higher throughput than is possible with a single PP 202. Systems incorporating one or more PPs 202 may be implemented in a variety of configurations and form factors, including, without limitation, desktops, laptops, handheld personal computers or other handheld devices, servers, workstations, game consoles, embedded systems, and the like.

Figure 3A:
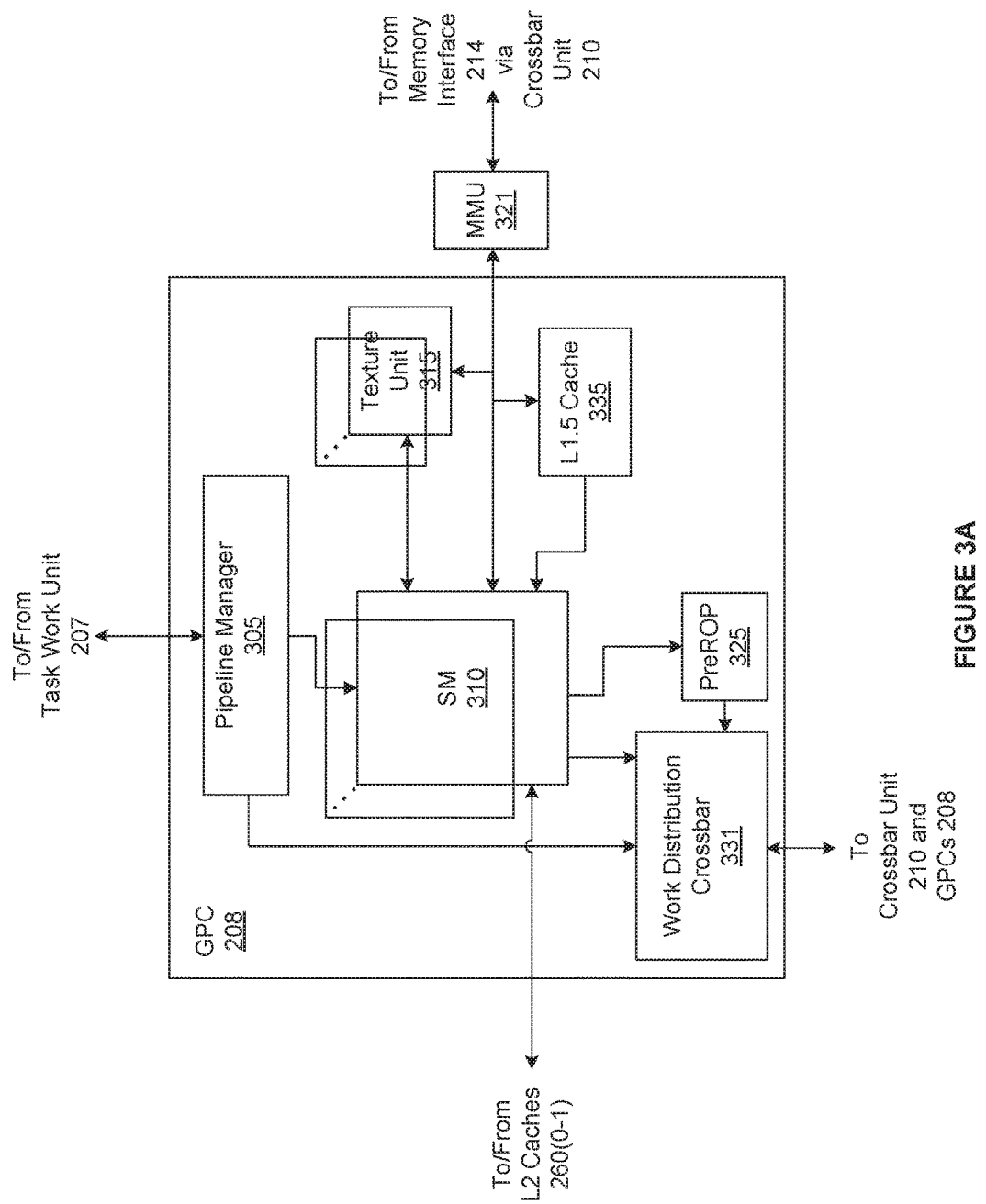
FIG. 3A is a more detailed block diagram of a general processing cluster included in the parallel processor of FIG. 2, according to various embodiments of the present invention.

FIG. 3A is a more detailed block diagram of a general processing cluster (GPC) 208 included in the parallel processor 202 of FIG. 2, according to various embodiments of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 331 by specifying destinations for processed data output by SMs 310.

In one embodiment, GPC 208 includes a set of M of SMs 310, where M 1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to the level two (L2) caches that are shared among all GPCs 208 in PP 202. The L2 caches may be used to transfer data between threads. Finally, SMs 310 also have access to off-chip "global" memory, which may include PP memory 204 and/or system memory 104. It is to be understood that any memory external to PP 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 321 that is configured to map virtual addresses into physical addresses. In various embodiments, MMU 321 may reside either within GPC 208 or within the memory interface 214. The MMU 321 includes a set of page table entries (PTEs) used to map a virtual address to a physical address of a tile or memory page and optionally a cache line index. The MMU 321 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 331 in order to provide the processed task to another GPC 208 for further processing or to store the processed task in one of the L2 caches 260, parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processors, such as SMs 310, texture units 315, or preROP units 325, may be included within GPC 208. Further, as described above in conjunction with FIG. 2, PP 202 may include any number of GPCs 208 that are configured to be functionally similar to one another so that execution behavior does not depend on which GPC 208 receives a particular processing task. Further, each GPC 208 operates independently of the other GPCs 208 in PP 202 to execute tasks for one or more application programs. In view of the foregoing, persons of ordinary skill in the art will appreciate that the architecture described in FIGS. 1-3A in no way limits the scope of the present invention.

Implementing a Graphics Processing Pipeline

Figure 3B:
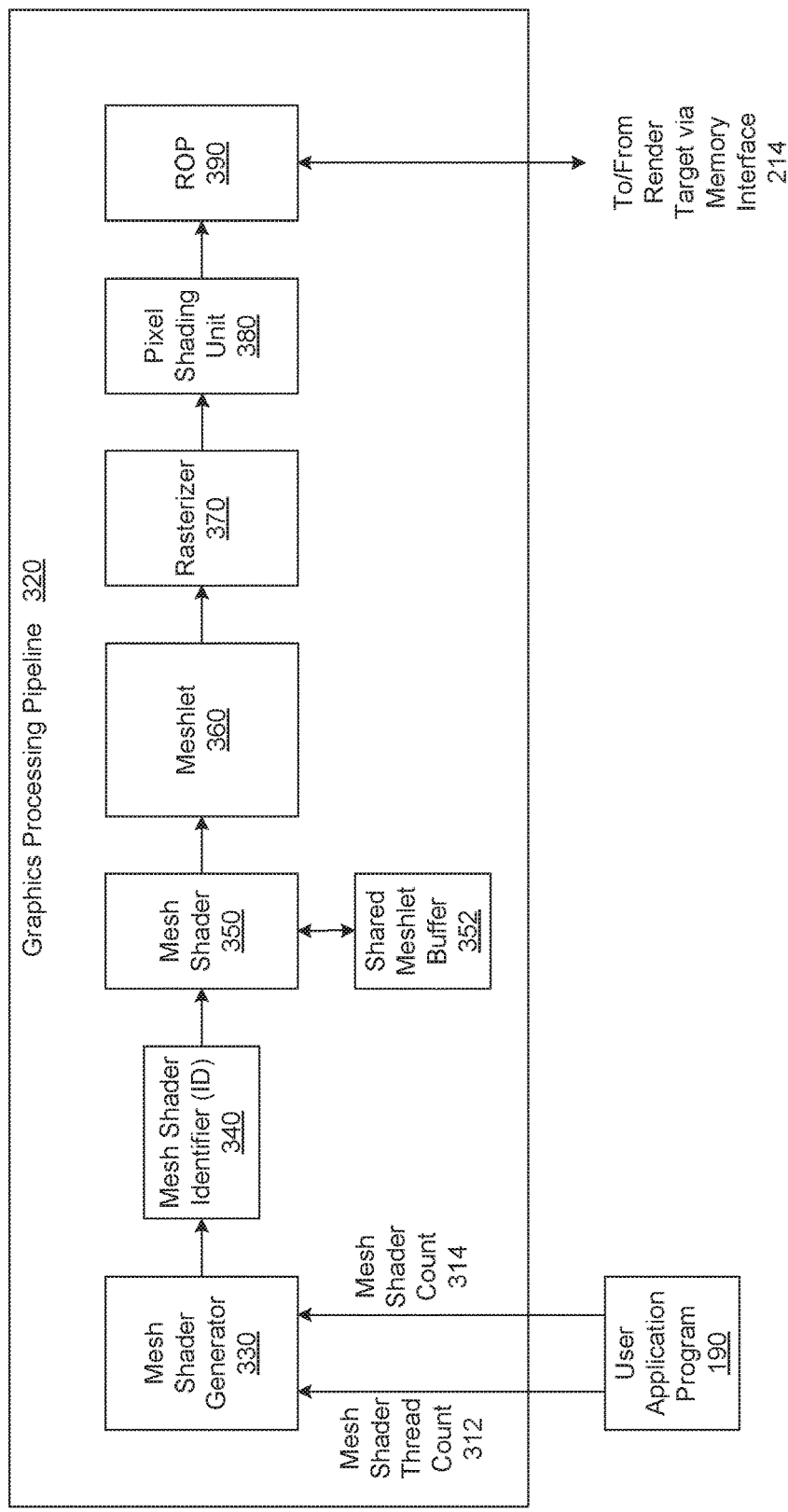
FIG. 3B is a conceptual diagram of a graphics processing pipeline that is implemented within the parallel processor of FIG. 2, according to various embodiments of the present invention.

FIG. 3B is a conceptual diagram of a graphics processing pipeline 320 that is implemented within the parallel processor 202 of FIG. 2, according to one embodiment of the present invention. As persons skilled in the art will recognize, a conventional graphics processing pipeline typically includes a single fixed-function hardware unit known as the primitive distributor. The primitive distributor collects vertex data associated with high-order surfaces, graphics primitives, and the like, from a front end unit and constructs corresponding batches of work, where each batch of work includes vertex data that defines multiple primitives. The batches of work are then processed by programmable execution units also included in the conventional graphics processing pipeline. During execution, the batches of work are distributed across a set of streaming multiprocessors that are configured to execute a large number of threads in parallel to perform graphics operations on the vertex data based on a programming model. Oftentimes, according to the programming, each vertex included in a given batch of work is independently processed by a different thread.

One limitation of conventional graphics processing pipelines is that the throughput of the graphics processing pipeline is limited by the throughput of the primitive distributor. More particularly, the primitive distributor typically is a fixed-function hardware unit having a fixed throughput and limited scalability. Consequently, as the memory bandwidth and number of streaming multiprocessors increase, the primitive distributor limits the overall performance of the conventional graphics processing pipeline. For example, if the primitive distributor has a throughput of 16 primitives per clock cycle, then the overall throughput of the conventional graphics processing pipeline is limited to 16 primitives per clock cycle irrespective of the memory bandwidth and/or the number of streaming multiprocessors supporting the graphics pipeline.

Another limitation of conventional graphics processing pipelines is that the applicable programming model is inflexible. Among other things, the programming model does not allow applications to execute certain operations earlier in the pipeline to make overall execution more efficient. For example, as noted above, the programming model oftentimes enforces a one-to-one correspondence between the vertices and the threads, where each vertex included in a batch of work is independently processed by a different thread. Because a given thread processes a given vertex independently of the vertices being processed by other threads, there is no good way to program the vertex processing unit to perform culling operations in order to discard non-visible primitives at the vertex processing stage of the conventional graphics processing pipeline. For instance, a thread that is processing a single vertex included in a given triangle primitive is unable to determine whether the triangle primitive is visible in a final image because two other vertices being processed by two other threads need to be involved in that determination. Because the vertex processing unit cannot be programmed to cull non-visible primitives, downstream units in the conventional graphics processing pipeline end up performing unnecessary graphics operations on those non-visible primitives, thus wasting both processing resources and power.

To improve the performance and flexibility of the graphics processing pipeline 320 relative to conventional graphics processing pipelines, the graphics processing pipeline 320 provides more flexible mechanisms for receiving and processing graphics data. In particular, the graphics processing pipeline 320 includes, without limitation, a mesh shader generator 330 and any number of mesh shaders 350 that replace the primitive distributor, the vertex shading units, and the geometry shading units included in conventional graphics processing pipelines.

Each of the mesh shaders 350 comprises a group of threads that cooperatively execute the mesh shading program 192 based on an associated mesh shading identifier (ID) 340 to generate a meshlet 360. Each meshlet 360 is an in-pipe representation of geometry included in a portion of an input grid associated with the mesh shading ID 340. As a general matter, "in-pipe" data refers to data that is stored in an on-chip memory accessible to the graphics processing pipeline 320. For example, the meshlets 360 could be stored in the L1.5 cache 335 or an L1 cache, but not the PP memory 204. As described in greater detail in conjunction with FIG. 4, each of the meshlets 360 implements a fixed format that enables subsequent units in the graphics processing pipeline 230 to properly interface with and interpret the meshlet 360.

As shown, the graphics processing pipeline 320 includes, without limitation, the mesh shader generator 330, any number of the mesh shader identifiers (ID) 340, any number of the mesh shaders 350, any number of the meshlets 360, a rasterizer 370, a pixel shading unit 380, and a raster operations processor (ROP) 390. For explanatory purposes only, each of the components in the graphics processing pipeline 320 is also referred to herein as a "unit" that implements a "stage" in the graphics processing pipeline 320.

The mesh shader generator 330 is a fixed-function processing unit that receives a mesh shader thread count 312 and a mesh shader count 314 from the user application program 190. The mesh shader thread count 312 specifies a number of threads to include in each mesh shader 350. The mesh shader count 314 specifies a total number of mesh shaders 350 that the mesh shader generator 330 is to invoke. To invoke each of the mesh shaders 350, the mesh shader generator 330 provides a different mesh shader ID 340 to a different group of threads and configures the group of threads to cooperatively execute the mesh shading program 192. The total number of threads in each group of threads is equal to the mesh shader thread count 312. The mesh shader IDs 340 are consecutive integers ranging from 0 to N−1 (inclusive), where N is the mesh shader count 314.

In some embodiments, each of the mesh shaders 350 is responsible for a different portion of an input mesh. The mesh shader ID 340($i$) enables the mesh shader 350($i$) to locate graphics data for the portion of the input mesh for which the mesh shader 350($i$) is responsible. For example, the mesh shading program 192 could configure the mesh shader 350($i$) to locate attributes and the topology of graphics primitives associated with an upper left portion of an input mesh based on a base image address and the mesh shader ID 340($i$). In alternate embodiments, the mesh shader 350($i$) may read and process any type of data based on the mesh shader ID 340($i$) instead of a portion of an input mesh.

A mesh shader programming model defines how the threads comprising the mesh shader 350 execute the mesh shading program 192. The mesh shader programming model specifies that the threads comprising the mesh shader 350($i$) receive a single input, the mesh shader ID 340($i$), and cooperatively generate a single output, the meshlet 360($i$). Notably, the mesh shader programming model allows the mesh shading program 192 to define any relationship between vertices and threads and any relationship between graphics primitives and threads.

The mesh shader programming model allows the mesh shading program 192 to allocate a shared meshlet buffer 352 in on-chip memory. The mesh shader 350($i$) allocates the shared meshlet buffer 352($i$) in on-chip memory when the mesh shader 350($i$) is invoked. While the mesh shader 350 executes, the shared meshlet buffer 352($i$) facilitates communication between the threads comprising the mesh shader 350($i$). When the mesh shader 350($i$) terminates, the shared meshlet buffer 352($i$) is freed.

The mesh shader programming model also defines the operations that the mesh shading program 192 may configure the mesh shader 350 to perform. As a general matter, the mesh shader 350 may perform any operations that are available to a cooperative thread array (CTA). Examples of operations that the mesh shader 350 may perform include, without limitation, read/load operations, general compute operations, vertex shading operations, geometry shading operations, and write/store operations. Importantly, the mesh shader 350 may also perform any number of synchronization operations, such as barrier operations, between the threads that comprise the mesh shader 350. Further, the threads that comprise the mesh shader 250 may execute an instruction, such as a matching instruction, that performs one or more cooperative operations across the threads without accessing shared memory.

For example, in some embodiments, the mesh shader 350 implements a three phase compute process. In a first phase, each thread fetches the positions of one or more vertices from the off-chip memory, performs transformation operations on the vertices, and writes the transformed vertex positions to the meshlet 360. In a second phase, after all the threads have finished executing the first phase, each thread fetches the topology of a graphics primitive from the off-chip memory and evaluates whether to cull the graphics primitive based on the transformed vertex positions. The threads then write the topology of the graphics primitives that are not culled to the meshlet 360. In a third phase, after all the threads have finished executing the second phase, each thread fetches additional attributes for one or more vertices that are included in the graphics primitives that are not culled, processes the attributes for the vertices, and writes the processed vertex attributes to the meshlet 360.

Notably, the number of threads comprising the mesh shader 350 is not necessarily equal to the number of vertices processed by the mesh shader 350. Further, the number of vertices for which the mesh shader 350 fetches graphics data is not necessarily equal to the number of vertices that the mesh shader 350 describes in the meshlet 360. Similarly, the number of threads comprising the mesh shader 350 is not necessarily equal to the number of graphics primitives processed by the mesh shader 350. Further, the number of graphics primitives for which the mesh shader 350 fetches graphics data is not necessarily equal to the number of graphics primitives that the mesh shader 350 describes in the meshlet 360.

In general, the mesh shaders 350 comply with any number of constraints associated with the graphics processing pipeline 320, the PP 202, and the on-chip memory. For instance, in some embodiments, the type of the graphics primitives (e.g., triangle, line, point) processed by the mesh shaders 350 and described in the meshlets 360 is defined by a state associated with the graphics processing pipeline 320. In the same or other embodiments, the mesh shader thread count 312 is constrained to a maximum of 32 threads.

The mesh shader IDs 340 define a processing order for the meshlets 360. More specifically, subsequent units in the graphics processing pipeline 320 process the meshlets 360 based on the mesh shader IDs 340. For instance, in some embodiments, the graphics processing pipeline 320 feeds the meshlets 360 to the rasterizer 370 based on an ascending order of mesh shader IDs 340.

The rasterizer 370 reads the meshlets 360, scans the graphics primitives, and transmits fragments and coverage data to the pixel shading unit 380. Additionally, the rasterizer 385 may be configured to perform z culling and other z-based optimizations.

The pixel shading unit 380 is a programmable execution unit that is configured to execute fragment shading programs, transforming fragments received from the rasterizer 370, as specified by the fragment shading programs. Fragment shading programs may shade fragments at pixel-level granularity, where such shading programs may be called pixel shading programs. Alternatively, fragment shading programs may shade fragments at sample-level granularity, where each pixel includes multiple samples, and each sample represents a portion of a pixel. Alternatively, fragment shading programs may shade fragments at any other technically feasible granularity, depending on the programmed sampling rate.

In various embodiments, the pixel shading unit 380 may be programmed to perform operations such as perspective correction, texture mapping, shading, blending, and the like, to produce shaded fragments that are transmitted to the ROP 390. The pixel shading unit 380 may read data that is stored in shared memory.

The ROP 390 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 390 is configured to compress z or color data that is written to memory and decompress z or color data that is read from memory. In various embodiments, the ROP 390 may be located in the memory interface 214, in the GPCs 208, in the processing cluster array 230 outside of the GPCs 208, or in a separate unit (not shown) within the PPs 202.

The graphics processing pipeline 320 may be implemented by any one or more processing elements within PP 202. For example, one of the SMs 310 of FIG. 3A could be configured to perform the functions of the pixel shading unit 390. The functions of the the mesh shader generator 320, the rasterizer 370, and the ROP 390 may also be performed by processing elements within a particular GPC 208 in conjunction with a corresponding partition unit 215. Alternatively, the graphics processing pipeline 320 may be implemented using dedicated fixed-function processing elements for one or more of the functions listed above. In various embodiments, PP 202 may be configured to implement one or more graphics processing pipelines 320.

As used herein, a set of operations is defined as one or more instructions executed by a single thread, by a thread group, or by multiple thread groups acting in unison. Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

It will be appreciated that the graphics processing pipeline 320 shown herein is illustrative and that variations and modifications are possible. For instance, in various embodiments, any number of the units in the graphics processing pipeline 320 may be implemented while other elements may be omitted or replaced in any technically feasible fashion. Among other things, any of a viewport scale, cull, and clip unit (VPC), a tiling unit, and a setup unit may be included in the graphics processing pipeline 320.

Note that the techniques described herein are illustrative rather than restrictive, and may be altered without departing from the broader spirit and scope of the invention. Many modifications and variations on the functionality provided by the mesh shader generator 330, the mesh shaders 350, and the mesh shader programming model will be apparent to those of ordinary skill in the art without departing from the scope and spirit of the described embodiments. For instance, in various embodiments, any number of the techniques and/or constraints may be implemented while other techniques and/or constraints may be omitted or replaced in any technically feasible fashion. In various embodiments, the mesh shaders 350 may be invoked and programmed in any technically feasible fashion.

Figure 4:
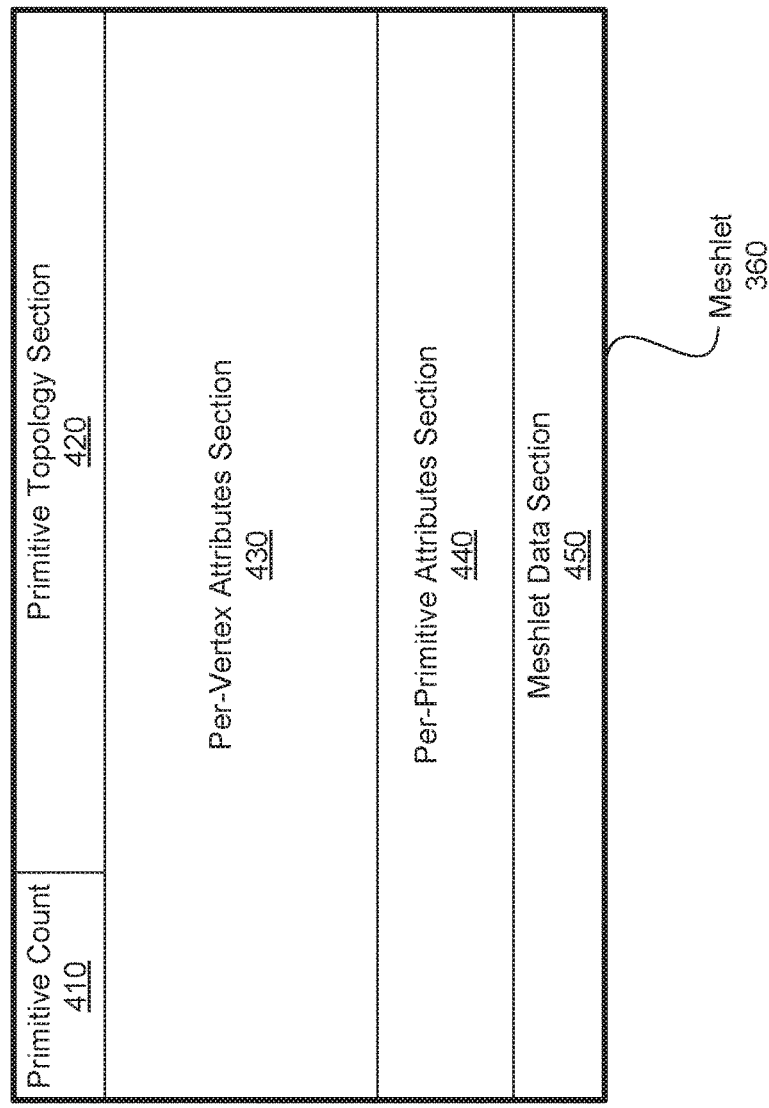
FIG. 4 is a more detailed block diagram of the meshlet of FIG. 3B, according to various embodiments of the present inventions.

FIG. 4 is a more detailed block diagram of the meshlet 360 of FIG. 3B, according to various embodiments of the present inventions. Although FIG. 4 describes a single meshlet 360, the meshlet programming model enforces the associated architecture and constraints for all of the meshlets 340. As shown, the meshlet 360 includes, without limitation, a primitive count 410, a primitive topology section 420, a per-vertex attributes section 430, a per-primitive attributes section 440, and a meshlet data section 450.

The primitive count 410 and the primitive topology section 420 are referred to collectively as the "meshlet header." By contrast, the per-vertex attributes section 430, the per-primitive attributes section 440, and the meshlet data section 450 are referred to collectively as the "meshlet body." In alternate embodiments, the meshlet 360 may include any number of the sections while other sections may be omitted or replaced in any fashion that provides a consistent interface to subsequent components in the graphics processing pipeline 320.

In various embodiments, the size and/or composition of the meshlet body and each of the sections included in the meshlet 360 are subject to constraints. For instance, in some embodiments the combined size of the shared meshlet buffer 352 and the meshlet body is limited to a maximum of 16 kilobytes (KB). Further, the size of the per-vertex attributes sections 430 is limited to 16 KB, and the size of the per-primitive attributes section 440 is limited to 16 KB. The total number of attributes specified for each vertex in the per-vertex attribute section 430 is limited to 32 vector attributes or 128 scalar attributes, and the total number of attributes specified for each primitive in the per-primitive attribute section 440 is limited to 32 vector attributes or 128 scalar attribute.

In operation, as part of enforcing the constraints associated with the meshlet 360, the meshlet programming model allows the developer to express the maximum number of vertices and the maximum number of graphics primitives that may be described in the meshlet 360. After ensuring that the maximum number of vertices and the maximum number of graphics primitives comply with any existing constraints, the meshlet programming model defines the total size and format of the meshlet header. More precisely, the total size of the meshlet header is defined based on the maximum number of vertices, the number of per-vertex attributes, the maximum number of graphics primitive, and the number of per-primitive attributes.

The primitive count 410 specifies a total number of graphics primitives described in the meshlet 360. The primitive count 410 may be equal to zero to specify that the mesh shader 330 has culled all the graphics primitives processed by the mesh shader 330. The primitive topology section 420 specifies the vertices included in the graphics primitives. The type of the graphics primitives and, consequently, the number of vertices included in each graphics primitives, is specified by the state of the graphics processing pipeline 320. In alternate embodiments, the types of the graphics primitives may vary, and the type of each graphics primitive may be specified in any technically feasible fashion.

For each vertex included in the primitive topology section 420, the per-vertex attributes section 430 includes values for each of any number of vertex attributes. Examples of vertex attributes include, without limitation, a surface normal, a color, a location, a transparency value, and so forth. For each of the primitives described in the primitive topology section 430, the per-primitive attributes section 440 includes values for each of any number of primitive attributes. Examples of primitive attributes include, without limitation, a surface normal, a color, a texture map coordinate, a viewport array mask, and so forth. The viewport array mask indicates the viewports to which the primitive should be sent via bits, where each bit represents one viewport. As persons skilled in the art will recognize, unlike conventional graphics processing pipelines that indirectly associate values for primitive attributes via a "provoking vertex" of a graphics primitive, the meshlet 360 directly associates values for primitive attributes with a graphics primitive.

The meshlet data section 450 may include any amount and type of information associated with the meshlet 360. For instance, in various embodiments, the meshlet data section 450 may include any number of per-meshlet attributes. Examples of per-meshlet attributes include, without limitation, a bounding box, an address within a frame buffer, and a characteristic of a tessellation patch.

Figure 5:
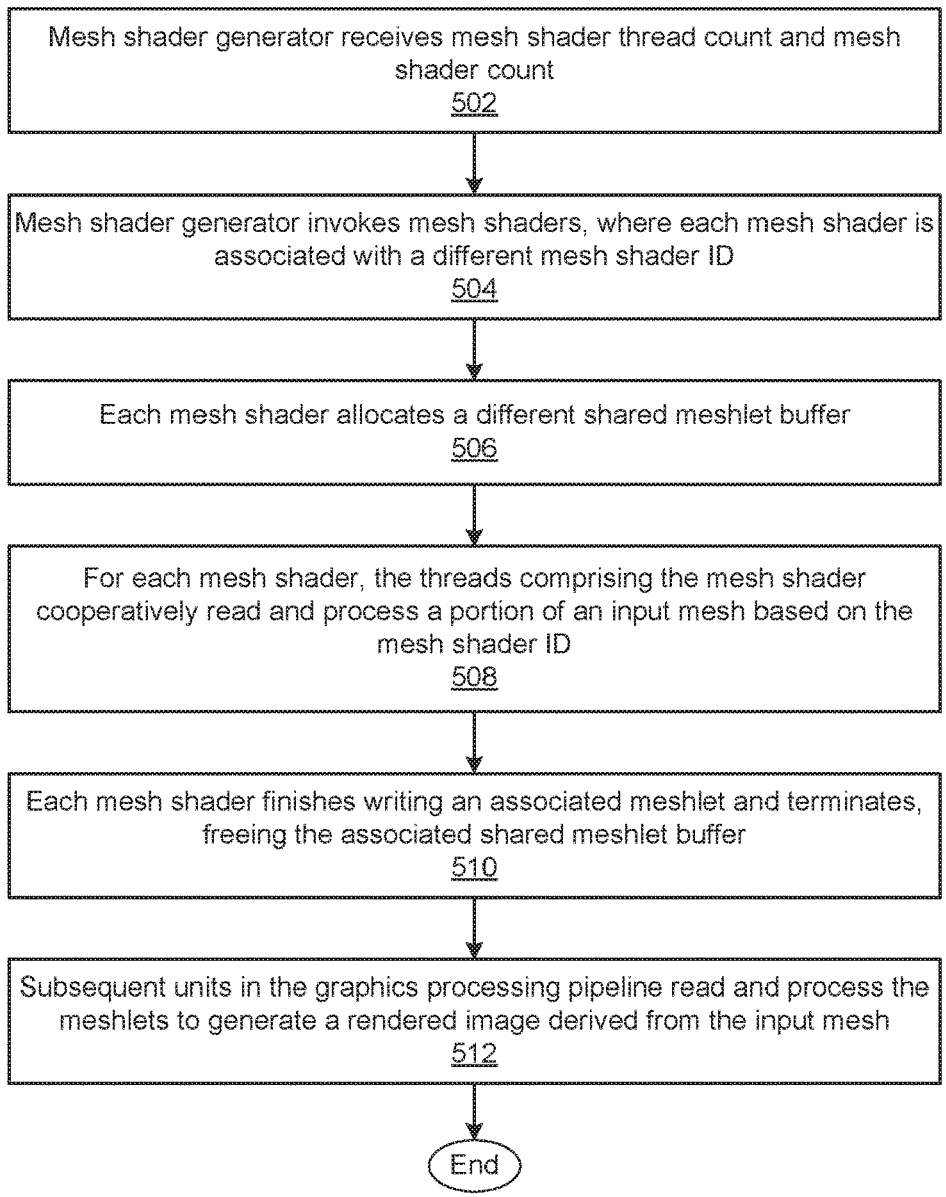
FIG. 5 is a flow diagram of method steps for processing image data via a graphics processing pipeline, according to various embodiments of the present invention.

FIG. 5 is a flow diagram of method steps for processing image data via a graphics processing pipeline, according to various embodiments of the present invention. Although the method steps are described in conjunction with the systems of FIGS. 1-4, persons skilled in the art will understand that any system configured to perform the method steps, in any order, falls within the scope of the present invention.

As shown, a method 500 begins at step 502, where the mesh shader generator 330 receives the mesh shader thread count 312 and the mesh shader count 314. At step 504, the mesh shader generator 330 invokes the mesh shaders 350, where a total number of the mesh shaders 350 is equal to the mesh shader count 314. To invoke each of the mesh shaders 350, the mesh shader generator 330 provides a different mesh shader ID 340 to a different group of threads and configures the group of threads to cooperatively execute the mesh shading program 192. The total number of threads in each group of threads is equal to the mesh shader thread count 312. The mesh shader IDs 340 are consecutive integers ranging from 0 to N−1 (inclusive), where N is the mesh shader count 314. At step 506, as per the mesh shading program 192, each of the mesh shaders 350 allocates a different shared meshlet buffer 352 in on-chip memory.

At step 508, for each of the mesh shaders 350, the threads comprising the mesh shader 350 cooperatively read and process graphics data associated with a portion of the input mesh based on the mesh shader ID 340. As part of step 508, the mesh shader 350 may perform any number and type of operations that are available to a cooperative thread array (CTA). Examples of operations that the mesh shader 350 may perform include, without limitation, read/load operations, general compute operations, vertex shading operations, geometry shading operations, synchronization operations, and write/store operations. In alternate embodiments, the mesh shader 350 may read and process any type of data based on the mesh shader ID 340 instead of a portion of an input mesh.

At step 510, each of the mesh shaders 350 finishes writing the associated meshlet 360 and terminates. Notably each of the meshlets 360 is stored in an on-chip memory and persists after the associated mesh shader 350 terminates. By contrast, when a given mesh shader 350 terminates, the associated shared meshlet buffer 352 is freed. At step 512, subsequent units in the graphics processing pipeline 320 read and process the meshlets 360 to generate a rendered image that is derived from the input mesh.

As persons skilled in the art will recognize, each of the mesh shaders 360 may execute concurrently, sequentially, or any combination thereof with the other mesh shaders 360. Consequently, at any given time, any number of the mesh shaders 360 may be independently executing method steps 506-510 substantially in parallel with any number of other mesh shaders 360. As referred to herein, two or more mesh shaders 192 execute "substantially in parallel" when the parallel processor 202 performs different operations based on the mesh shader program 192 and two or more mesh shader identifiers 340, and at least a portion of the different operations overlap partially or fully in time. However, as described in conjunction with FIG. 3B, the mesh shader IDs 340 define an processing order for the meshlets 360 that is maintained by the subsequent units in the graphics processing pipeline 320 as part of step 512.

Implementing an Expanded Graphics Processing Pipeline

In some embodiments, to further increase the flexibility of the graphics processing pipeline 320, the graphics processing pipeline 320 is expanded to include one or more additional shader generators and any number of additional shaders that proceed the mesh shader generator 330. Each additional shader comprises a plurality of threads that cooperatively execute a shading program to generate a corresponding shader output. The shader output specifies a number of shaders to be invoked by a subsequent shader generator and any amount of additional data in any format. The mesh shader generator 330 and the mesh shaders 350 are modified to operate based on the shader outputs received from the preceding additional shaders.

Figure 6:
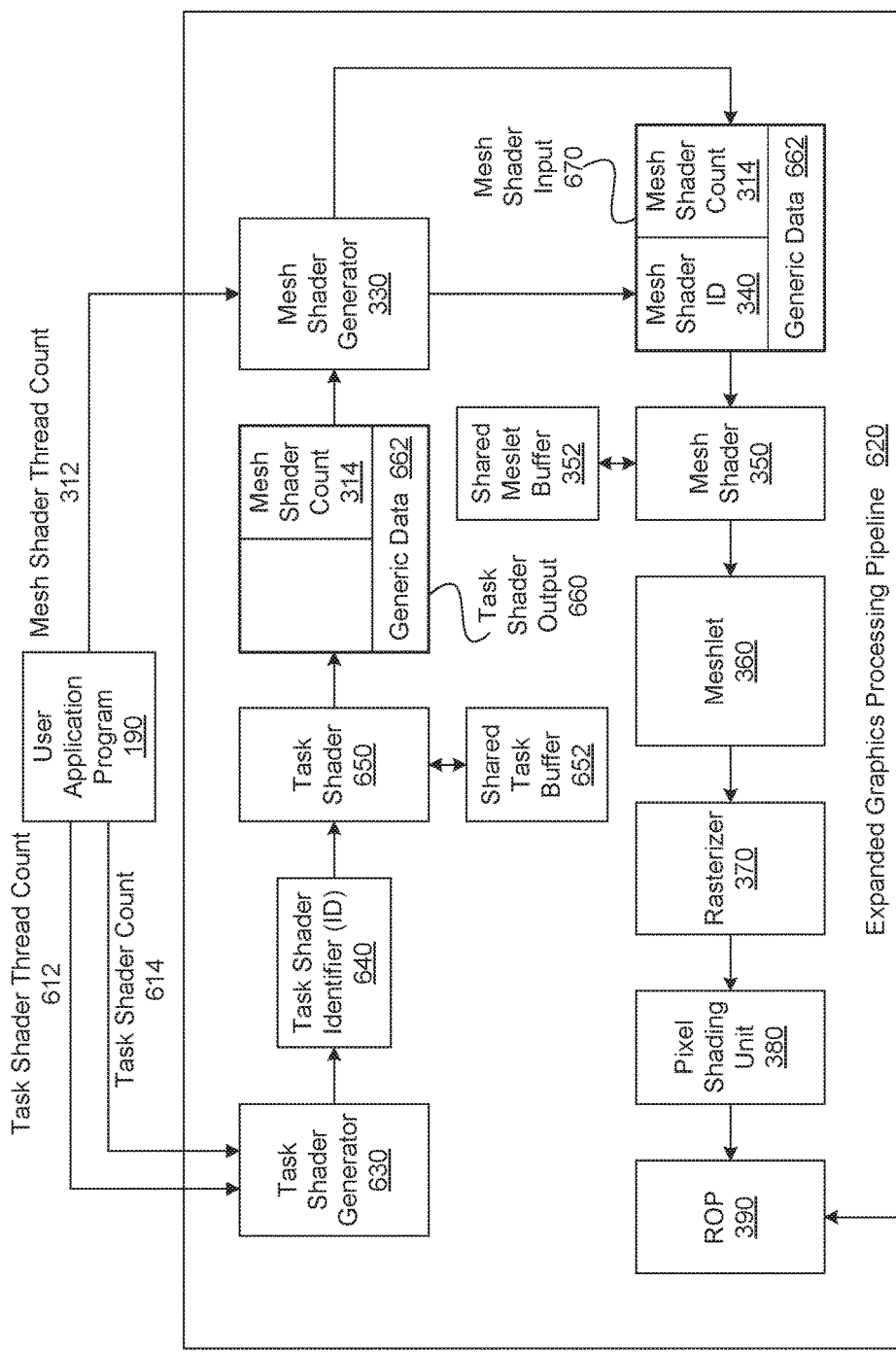
FIG. 6 is a conceptual diagram of an expanded graphics processing pipeline that may be implemented within the parallel processor of FIG. 2, according to various other embodiments of the present invention.

FIG. 6 is a conceptual diagram of an expanded graphics processing pipeline 620 that may be implemented within the parallel processor 202 of FIG. 2, according to various other embodiments of the present invention. As shown, the expanded graphics processing pipeline 620 includes, without limitation, a task shader generator 630, any number of task shader identifiers (ID) 640, any number of task shaders 650, the mesh shader generator 330, any number of task shader outputs 660, any number of the mesh shader identifiers (ID) 340, any number of mesh shader inputs 670, any number of the mesh shaders 350, any number of the meshlets 360, the rasterizer 370, the pixel shading unit 380, and the ROP 390.

The task shader generator 630 is a fixed-function processing unit that receives a task shader thread count 612 and a task shader count 614 from the user application program 190. The task shader thread count 612 specifies a number of threads to include in each task shader 650. The task shader count 614 specifies a total number of task shaders 650 that the task shader generator 630 is to invoke. To invoke each of the task shaders 650, the task shader generator 630 provides a different task shader ID 640 to a different group of threads and configures the group of threads to cooperatively execute the task shading program 394. The total number of threads in each group of threads is equal to the task shader thread count 612. The task shader IDs 640 are consecutive integers ranging from 0 to N−1 (inclusive), where N is the task shader count 614.

A task shader programming model defines how the threads comprising the task shader 650 execute the task shading program 194. The task shader programming model specifies that the threads comprising the task shader 650 receive a single input, the task shader ID 340, and cooperatively generate a single output, the task output 660, that is stored in on-chip memory. Notably, the task shader programming model allows the task shading program 194 to define any relationship between vertices and threads, and any relationship between graphics primitives and threads.

As shown, the task shader output 660 includes, without limitation, a mesh shader count 314 and generic data 662. The mesh shader count 314 specifies the mesh shader count 314. The generic data 662 specifies additional data in any format. The task shader 650 may determine the mesh shader count 314 and the generic data 662 in any technically feasible fashion.

For example, as part of dynamic level of detail (LOD) instancing, the task shader 650 could locate graphics data associated with a portion of an input mesh based on a base image address and the task shader ID 640. The task shader 650 could determine an LOD based on the graphics data and a view. Then, the task shader 650 could compute the mesh shader count 314 based on the LOD. The task shader 650 could then generate the generic data 662 that includes, without limitation, an address associated with a pre-computed mesh corresponding to the portion of the input mesh and the LOD.

The task shader programming model allows the task shading program 194 to allocate a shared task buffer 652 in on-chip memory. The task shader 350($i$) allocates the shared task buffer 652($i$) in on-chip memory when the task shader 650($i$) is invoked. While the task shader 650 executes, the shared task buffer 652($i$) facilitates communication between the threads comprising the task shader 650($i$). When the task shader 650($i$) terminates, the shared task buffer 652($i$) is freed.

The task shader programming model also defines the operations that the task shading program 194 can configure the mesh shader 650 to perform. As a general matter, the task shader 650 can perform any operations that are available to a cooperative thread array (CTA). Examples of operations that the task shader 650 can perform include, without limitation, read/load operations, general compute operations, vertex shading operations, tessellation operations, geometry shading operations, and write/store operations. Importantly, the task shader 650 may also perform any number of synchronization operations, such as barrier operations, between the threads that comprise the task shader 650. Further, the threads that comprise the task shader 650 may execute an instruction, such as a matching instruction, that performs one or more cooperative operations across the threads without accessing shared memory.

In general, the task shaders 650 and the task shader outputs 660 comply with any number of constraints associated with the graphics processing pipeline 320, the PP 208, and the on-chip memory. For instance, in some embodiments, the task shader thread count 314 is constrained to a maximum of 32 threads. In the same or other embodiments, for each of the task shader outputs 660, the combined size of the task shader output 660 and the shared task buffer 652 is limited to a maximum of 16 KB.

The mesh shader generator 330 receives the mesh shader thread count 312 from the user application program 190. The mesh shader thread count 312 specifies a number of threads to include in each of the mesh shaders 350. In addition, for each task shader 650($i$), the mesh shader generator 330 receives the task output 660($i$). The task shader IDs 340 define a processing order for the task shader outputs 660. In particular, the order in which the mesh shader generator 330 processes the task shader outputs 660 is based on the task shader IDs 640. For instance, in some embodiments, the graphics processing pipeline 320 feeds the task shader outputs 660 to the mesh shader generator 330 based on an ascending order of the task shader IDs 640.

For each of the task outputs 660, the mesh shader generator 330 invokes one or more mesh shaders 350. More precisely, for the task output 660($i$), the mesh shader generator 330 generates the associated mesh shader IDs 340. The associated mesh shader IDs 340 are consecutive integers ranging from 0 to N−1 (inclusive), where N is the mesh shader count 314 specified in the task output 660($i$). For each of the mesh shader IDs 340, the mesh shader generator 330 then generates the mesh shader input 670 that includes the mesh shader ID 340, the total number of mesh shaders 314, and the generic data 662 included in the task output 660($i$). In some embodiments, to generate the mesh shader inputs 670, the mesh shader generator 330 may generate N copies of the task output 660($i$) and then modify each of the copies to specify a different one of the mesh shader IDs 340.

The mesh shader ID 340($i$) enables the mesh shader 350($i$) to locate data that is applicable to the portion of the input mesh for which the mesh shader 350($i$) is responsible. For example, the mesh shading program 192 could configure the mesh shader 350($i$) to apply the mesh shader ID 340($i$) as an index into the generic data 662 included in the associated mesh shader input 670.

The task shader generator, the task shaders, the mesh shader generator, and the mesh shaders may replace the primitive distributor, the vertex shaders, the hull shading unit, the tessellator, the domain shading unit and the geometry shading unit included in conventional graphics processing pipelines. Advantageously, the flexibility provided by the expanded graphics processing pipeline 660 enable in-pipe generation, expansion, and selection of geometry.

As persons skilled in the art will recognize, in-pipe manipulation of geometry is useful for dynamic LOD instancing, programmable tessellation patterns that adapt to displacement maps, procedural geometry, iso-surface extraction, hierarchical culling, and so forth. In hierarchical culling, evaluation of an imposter (e.g., a bounding box or cone of normal) is performed in a first stage, and finer evaluation of graphics primitives is performed in a second stage.

After the mesh shaders 350 invoked based on a particular task shader output 660 finishes executing, the task shader output 660 may be freed. However, the meshlets 360 persist through the remainder of the graphics processing pipeline 360. The rasterizer 370, the pixel shading unit 380, and the ROP 390 process each of the meshlets 360 as described in conjunction with FIG. 3B to generate rendered images. Importantly, the order in which subsequent units in the graphics processing pipeline 320 process the meshlets 360 is based on the task shader IDs 640 and the mesh shader IDs 340. For instance, in some embodiments, the graphics processing pipeline 320 feeds the meshlets 360 to the rasterizer 370 based on an ascending order of task shader IDs 640, and for each of the task shader IDs 640 based on an ascending order of the mesh shader IDs 340.

The expanded graphics processing pipeline 320 may be implemented by any one or more processing elements within PP 202. For example, one of the SMs 310 of FIG. 3A could be configured to perform the functions of the pixel shading unit 390. The functions of the mesh shader generator 330, the task shader generator 620, the rasterizer 370, and the ROP 390 may also be performed by processing elements within a particular GPC 208 in conjunction with a corresponding partition unit 215. Alternatively, the graphics processing pipeline 320 may be implemented using dedicated fixed-function processing elements for one or more of the functions listed above. In various embodiments, PP 202 may be configured to implement one or more graphics processing pipelines 320.

It will be appreciated that the expanded graphics processing pipeline 620 shown herein is illustrative and that variations and modifications are possible. For instance, in various embodiments, any number of the units in the expanded graphics processing pipeline 620 may be implemented while other units may be omitted or replaced in any technically feasible fashion. Among other things, any of a viewport scale, cull, and clip unit (VPC), a tiling unit, and a setup unit may be included in the expanded graphics processing pipeline 620.

Note that the techniques described herein are illustrative rather than restrictive, and may be altered without departing from the broader spirit and scope of the invention. Many modifications and variations on the functionality provided by the task shader generator 630, the task shaders 650, the mesh shader generator 330, the mesh shaders 350, the mesh shader programming model, and the task shader programming model will be apparent to those of ordinary skill in the art without departing from the scope and spirit of the described embodiments. For instance, in various embodiments, any number of the techniques and/or constraints may be implemented while other techniques and/or constraints may be omitted or replaced in any technically feasible fashion.

In various embodiments, the task shaders 650 and the mesh shader 350 may be invoked and programmed in any technically feasible fashion. In some embodiments, the user application program 190 may specify a maximum number of in-flight mesh shader inputs 670, and the functionality of the mesh shader generator 330 may be modified accordingly.

Figure 7:
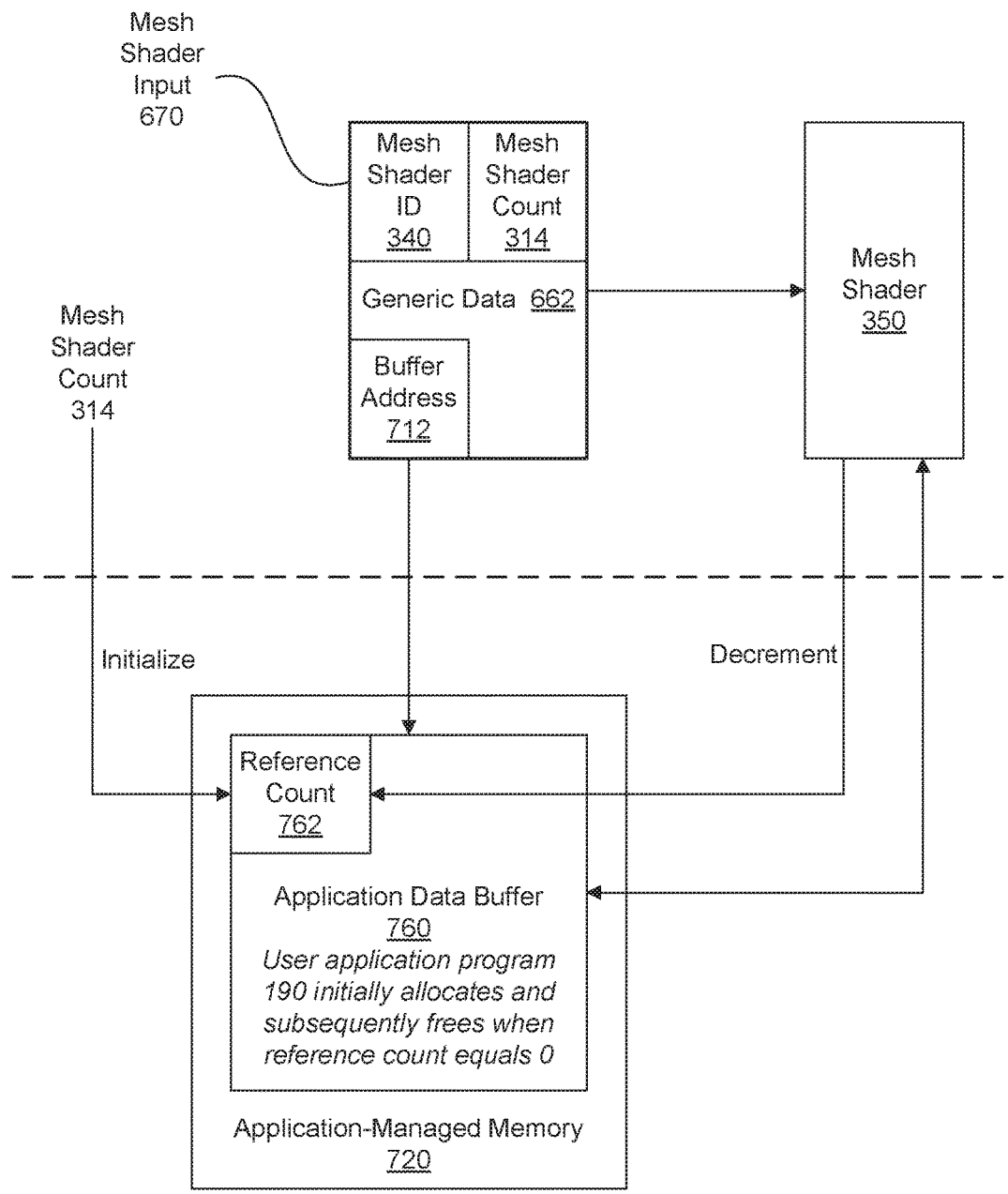
FIG. 7 is a more detailed illustration of the interactions between the mesh shader input and the mesh shader of FIG. 6 when supporting an application data buffer, according to various embodiments of the present inventions.

FIG. 7 is a more detailed illustration of the interactions between the mesh shader input 670 and the mesh shader 650 of FIG. 6 when supporting an application data buffer 760, according to various embodiments of the present inventions. The application data buffer 760 enables the transfer of relatively large amounts of data (e.g., exceeding 16 KB) between one of the task shaders 650 and the associated mesh shaders 350.

In operation, the user application program 190 dynamically allocates a portion of an application-managed memory 720 to store the application data buffer 760. As shown, the application data buffer 760 includes a reference count 762. In alternate embodiments, the reference count 762 may be stored in any memory that is accessible to the user application program 190. When the task shader 650 generates the task shader output 660, the task shader 660 specifies a buffer address 712 in the generic data 662. The buffer address 712 specifies the address of the application data buffer 760 and, consequently, can be used to locate the application data buffer 760. The task shader 650 also initializes the reference count 762 to the mesh shader count 314.

As described in conjunction with FIG. 6, as part of generating the mesh shader input 670, the mesh shader generator 330 copies the generic data 662 from the task shader output 660 to the mesh shader input 670. Consequently, the mesh shader 350 may access the application data buffer 760 via the buffer address 712. After the mesh shader 350 has finished reading data from the application data buffer 760, the mesh shader 350 decrements the reference count 762 in an atomic fashion (e.g., using an atomic instruction). After all the mesh shaders 350 invoked by the task shader 650 have finished executing, the reference count 762 is equal to zero. Upon detecting that the reference count 762 is equal to zero, the user application program 190 frees the application data buffer 760.

Figure 8A:
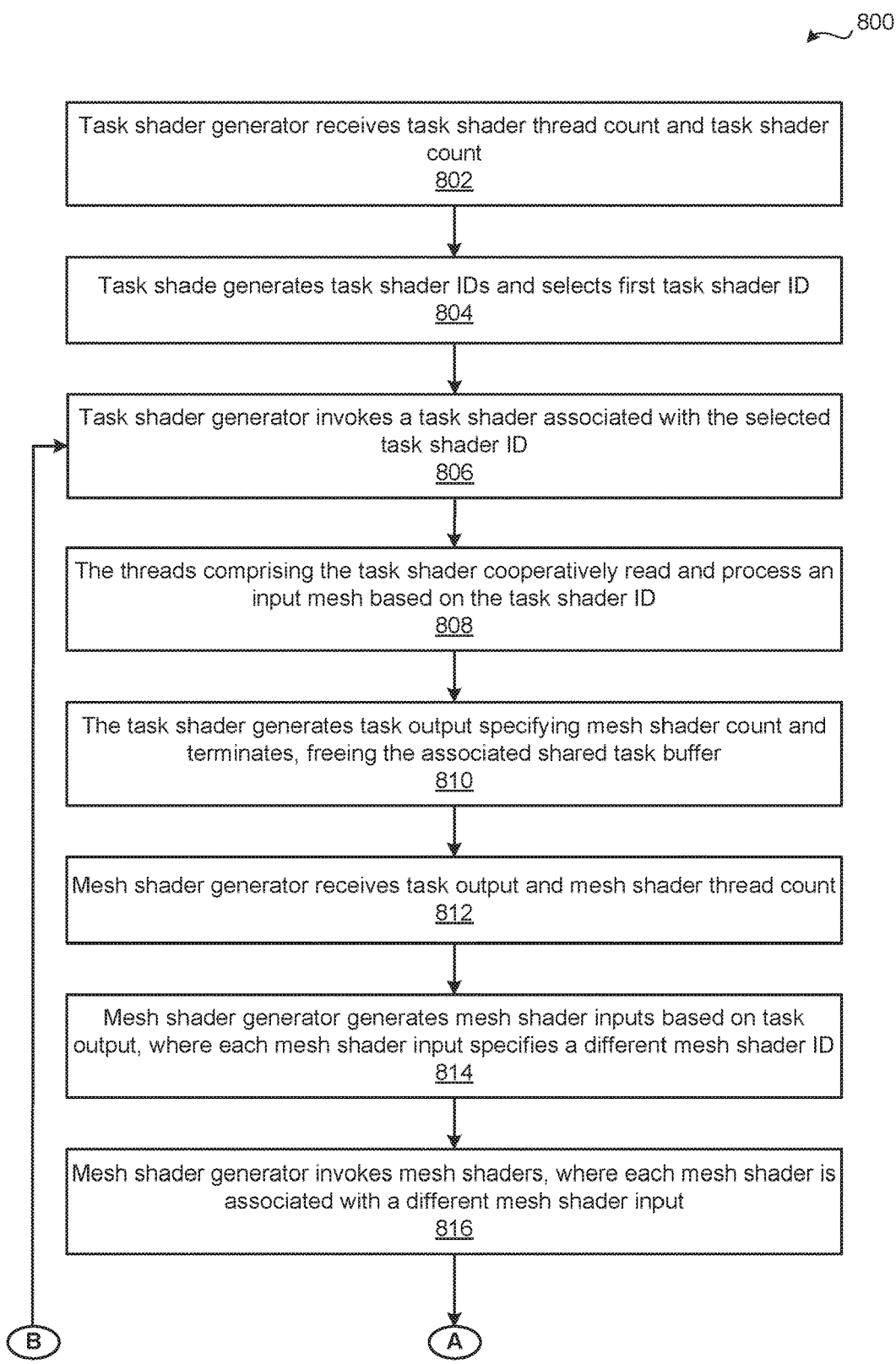
FIGS. 8A-8B set forth a flow diagram of method steps for processing image data via an expanded graphics processing pipeline, according to various embodiments of the present invention.
Figure 8B:
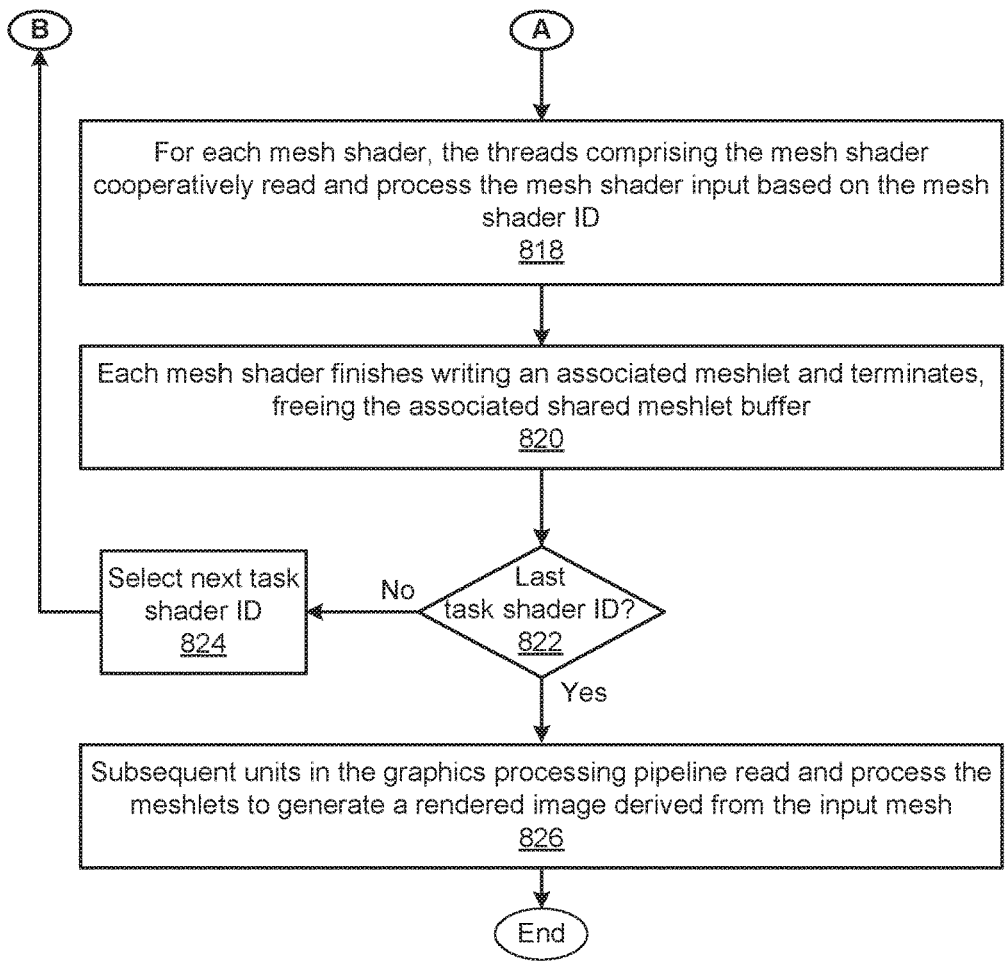

FIGS. 8A-8B set forth a flow diagram of method steps for processing image data via an expanded graphics processing pipeline, according to various embodiments of the present invention. Although the method steps are described in conjunction with the systems of FIGS. 1-3A, 6, and 7, persons skilled in the art will understand that any system configured to perform the method steps, in any order, falls within the scope of the present invention.

As shown, a method 800 begins at step 802, where the task shader generator 630 receives the task shader thread count 612 and the task shader count 614. At step 804, the task shader generator 630 generates the task shader IDs 640. The task shader IDs 640 are consecutive integers ranging from 0 to N−1 (inclusive), where N is the task shader count 614. The task shader generator 630 then selects the first task shader ID 640.

At step 806, the task shader generator 630 invokes the task shader 650 associated with the selected task shader ID 640. More specifically, the task shader generator 630 provides the selected task shader ID 640 to a group of threads and configures the group of threads to cooperatively execute the task shading program 194. The total number of threads in the group of threads is equal to the task shader thread count 612. As per the task shading program 194, the task shader 650 allocates an associated shared task buffer 652 in on-chip memory when the task shader 650 is invoked.

At step 810, as per the thread shading program 194, the task shader 650 generates the task shader output 660. The task shader output 660 specifies the mesh shader count 314 and is stored in on-chip memory. After generating the task shader output 660, the task shader 650 terminates and the associated shared task buffer 652 is freed. At step 812, the mesh shader generator 330 receives the task shader output 660 from the task shader 650 and the mesh shader thread count 312 from the user application program 190.

At step 814, the mesh shader generator 330 generates the mesh shader inputs 670 based on the task shader output 660. The total number of the mesh shader inputs 670 is equal to the mesh shader count 314. Each of the mesh shader inputs 670 includes the data specified in the task shader output 660 in addition to a different mesh shader ID 340. The mesh shader IDs 340 are consecutive integers ranging from 0 to M−1 (inclusive), where M is the mesh shader count 314.

At step 816, the mesh shader generator 330 invokes the mesh shaders 350, where a total number of the mesh shaders 350 is equal to the mesh shader count 314. To invoke each of the mesh shaders 350, the mesh shader generator 330 provides a different one of the mesh shader inputs 670 to a different group of threads and configures the group of threads to cooperatively execute the mesh shading program 192. The total number of threads in each group of threads is equal to the mesh shader thread count 312. As per the mesh shading program 192, the mesh shader 350($i$) allocates the shared meshlet buffer 352($i$) in on-chip memory when the mesh shader 350($i$) is invoked.

At step 818, for each of the mesh shaders 350, the threads comprising the mesh shader 350 cooperatively read and process the mesh shader input 670 based on the mesh shader ID 340. At step 820, each of the mesh shaders 350 finishes writing the associated meshlet 360 and terminates. Notably each of the meshlets 360 is stored in an on-chip memory and persists after the associated mesh shader 350 terminates. By contrast, when a given mesh shader 350 terminates, the associated shared meshlet buffer 352 is freed.

At step 822, the task shader generator 630 determines whether the selected task ID 640 is the last task ID 640. If, at step 822, the task shader generator 630 determines that the selected task ID 640 is not the last task ID 640, then the method 800 proceeds to step 824. At step 824, the task shader generator 630 selects the next task ID 640, and the method 800 returns to step 806 where the task shader generator 630 invokes another task shader 650.

If, however, at step 822, the task shader generator 630 determines that the selected task ID 640 is the last task ID 640, then the method 800 proceeds directly to step 826. At step 826, subsequent units in the graphics processing pipeline 320 read and process the meshlets 360 to generate a rendered image that is derived from the input mesh.

As persons skilled in the art will recognize, each of the task shaders 660 may execute concurrently, sequentially, or any combination thereof with the other task shaders 660. Consequently, at any given time, any number of the task shaders 660 may be independently executing method steps 808-810 substantially in parallel with any number of other tasks shaders 660. As referred to herein, two or more task shaders 660 execute "substantially in parallel," when the parallel processor 202 performs different operations based on the task shader program 194 and two or more task shader identifiers 640, and at least a portion of the different operations overlap partially or fully in time.

However, as described in conjunction with FIG. 6, the task shader IDs 640 define an processing order for the task shader outputs 660 that is maintained by the subsequent units in the graphics processing pipeline 320. Further, the subsequent units in the graphics processing pipeline may process the meshlets 360 before, during, or after other meshlets 360 are generated, and the method steps 822-826 are modified accordingly.

Deduplicating an Index Buffer

Figure 9A:
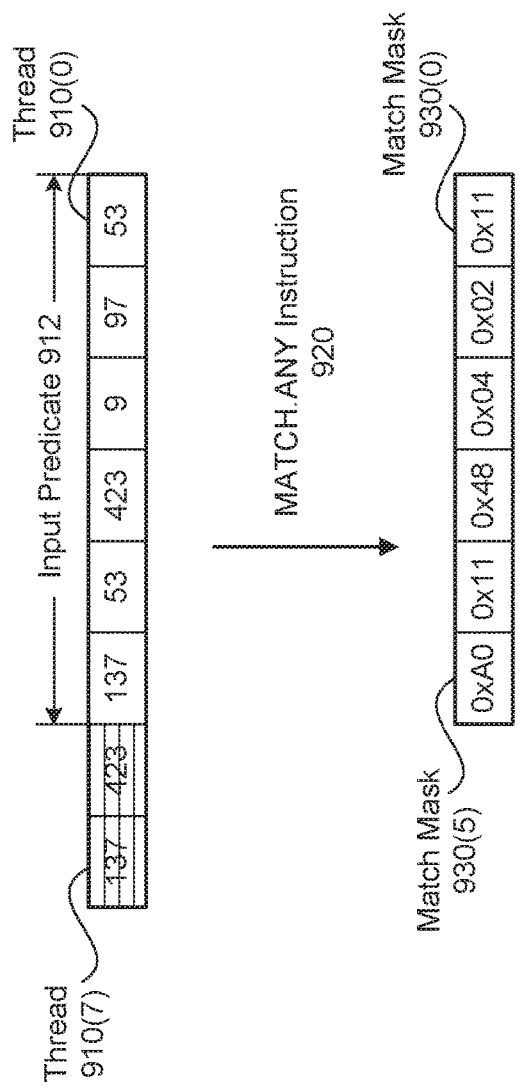
FIGS. 9A-B illustrate how the deduplication application of FIG. 1 generates a shader batch, according to various embodiments of the present invention.
Figure 9B:
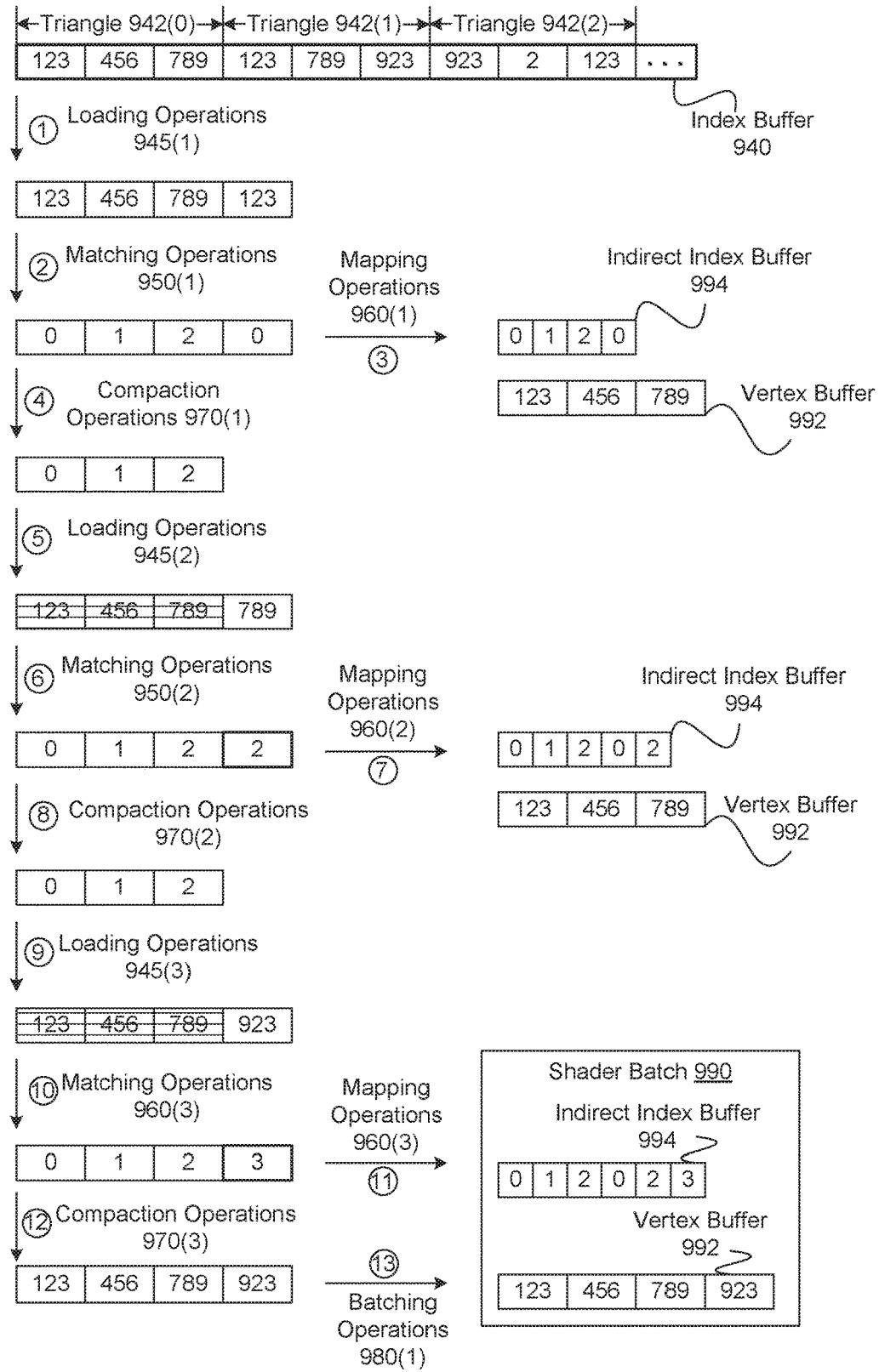

FIGS. 9A-9B illustrate how the deduplication application 182 of FIG. 1 generates a shader batch 990, according to various embodiments of the present invention. In a conventional graphics processing pipeline, the primitive distributor generates batches of work based on an index buffer 940 that specifies the vertices that make up multiple graphics primitives. Each batch of work represents a different portion of the index buffer 940, and is processed by subsequent programmable units included in the conventional graphics processing pipeline.

To reduce the memory required to store the index buffer 940, oftentimes the primitive distributor performs on-the-fly deduplication operations when forming the batches of work. Instead of storing multiple copies of the same vertex identifier, the primitive distributor generates a vertex buffer 992 that includes unique vertex identifiers, and an indirect index buffer 994 that references entries in the vertex buffer 992. For example, if the index buffer 940 contained the vertex identifiers 576, 324, 129, 129, 324, 23, then the vertex buffer 992 would contain the vertex identifiers 576, 324, 129, 23, and the indirect index buffer 994 would contain the indirect indices 0, 1, 2, 2, 1, 3.

In some embodiments of the graphics processing pipeline 320, the mesh shading program 192 may define a shader batch 990 of work for each mesh shader 350 based on the mesh shader IDs 340. Similarly, in some embodiments of the expanded graphics processing pipeline 620, the task shading program 194 may define the shader batch 990 of work for each task shader 650 based on the task shader IDs 640. Each of the shader batches 990 is associated with a different portion of the index buffer 940.

To reduce the memory required to store the shader batches 990, the computer system 100 includes the deduplication application 182. In general, the deduplication application 182 performs deduplication operations on the index buffer 940 to generate optimized shader batches 990. Notably, the deduplication application 182 performs the deduplication operations based on a MATCH.ANY instruction 920 that executes on the PP 202. In alternate embodiments, the deduplication application 182 may perform deduplication operations based on any instruction or any matching algorithm in any technically feasible fashion.

In general, the MATCH.ANY instruction 920 performs comparison operations across the values associated with (i.e., loaded in) each of the threads 910 included in a thread group. For each thread 910 that is specified via an input predicate 912, the MATCH.ANY 920 performs exhaustive comparison operations with the other threads 910 and generates a match mask 930. For each predicated thread 910(x), if the leading one included in the match mask 930(x) is at the bit x, then the value associated with the thread 910(x) is not specified by any thread 910(y), where y is less than x. Consequently, a set of unique values is specified by the set of threads 910(x) having leading ones in the match mask 930(x) at the bit x. For the non-predicated threads 910, the MATCH.ANY instruction 920 does not perform exhaustive comparison operations and does not generate match masks 930. However, for each non-predicated thread 910(x), the MATCH.ANY instruction 920 performs exhaustive comparison operations between the non-predicated thread 910(x) and the predicated threads 910. In alternate embodiments, the MATCH.ANY instruction 920 does not support the input predicate 912, and the MATCH.ANY instruction 920 performs exhaustive comparisons between and generates the match masks 930 for all the threads 910 included in the thread group.

The size of the thread group that the MATCH.ANY instruction 920 operates on varies with the implementation of the PP 202, For instance, in some embodiments the MATCH.ANY instruction 920 may operate on a thread group that includes 32 threads 910. In alternate embodiments, the number of threads 910 that the MATCH.ANY instruction 930 operates on may vary based on hardware capabilities, software capabilities, user preferences, and the like.

For explanatory purposes only, FIG. 9A depicts an exemplary execution of the MATCH.ANY instruction 920 on a thread group that includes the threads 910(7)-910(0). The threads 910(7)-910(0) specify, respectively, the values 137, 423, 137, 53, 423, 9, 97, and 53. The input predicate 912 specifies the threads 910(5)-910(0). For explanatory purposes only, the non-predicated threads 910 are depicted as filled boxes. Based on the resulting match masks 930, the unique values included in the predicated threads 910 are 53, 9, and 97.

For explanatory purposes only, FIG. 9B depicts a sequence of events involved in translating the index buffer 940 to the shader batch 990 as a series of numbered bubbles. The MATCH.ANY instruction 920 illustrated in FIG. 9B operates on a thread group that includes 4 threads 910 and supports the input predicate 912. The shader batches 990 are subject to the batch constraints that each shader batch 990 includes a maximum of 4 vertices and a maximum of 4 graphics primitives. The primitive type associated with the input buffer 940 is a triangle 942, where each triangle 942 is represented in the index buffer 940 as three vertices.

In some embodiments, the MATCH.ANY instruction 920 may operate across a thread group containing a number of threads other than 4. In the same or other embodiments, the MATCH.ANY instruction 920 may not support the input predicate 912. In some alternate embodiments, the deduplication application 182 performs deduplication operations based on an instruction other than the MATCH.ANY instruction 920. In various embodiments, the number and type of constraints associated with the shader batches 990 may vary based on hardware capabilities, software capabilities, user preferences, and the like.

Upon receiving the index buffer 940, the deduplication application 182 identifies that the threads 910(3)-910(0) comprise a thread group, and generates the empty vertex buffer 992 and the empty indirect index buffer 994. As depicted with the bubble numbered 1, the deduplication application 182 executes loading operations 945(1) that load vertices from the index buffer 940 into the threads 910(3)-910(0). More specifically, the deduplication application 182 loads the four left-most vertices 123, 457, 789, and 123 specified in the index buffer 940 into, respectively, the threads 910(3), 910(2), 910(1), and 910(0).

As depicted with the bubble numbered 2, the deduplication application 182 then executes matching operations 950(1) across the threads 910(3)-910(0) based on the MATCH.ANY instruction 920, where all of the threads 910(3)-910(0) are specified in the input predicate 912. After executing the matching operations 950(1), the values of the threads 910(3)-910(0) specify indirect indices associated with the four left-most vertices included in the index buffer 940. More specifically, to cause the threads 910(3)-910(0) to specify the indirect indices, the deduplication application 182 applies the MATCH.ANY instruction 920 and then finds the leading ones in the resulting mask. As shown, the values of the threads 910(3)-910(0) are 0, 1, 2, 0, indicating that the four left-most vertices included in the index buffer 940 include three unique vertices.

Subsequently, as depicted with the bubble numbered 3, the deduplication application 182 executes mapping operations 960(1) that update the vertex buffer 992 and the indirect index buffer 994. To update the vertex buffer 994, the deduplication application 182 appends the three newly identified unique vertices to the vertex buffer 992. To update the indirect index buffer 994 the deduplication application 182 appends the newly identified indirect indices to the indirect index buffer 994.

As depicted with the bubble numbered 4, the deduplication application 182 then performs compaction operations 970(1) that consolidate the indirect indices for the unique vertices into the threads 910 that correspond to the highest order bits in the match mask 930. As part of the compaction operations 970(1), the deduplication application 182 selects the threads 910 that are not associated with unique vertices, and sets the input predicate 912 to specify the selected threads 910. For explanatory purposes only, the non-selected threads 910 are depicted as filled boxes.

Although not depicted, the deduplication application 182 then determines that the shader batch 990 is not yet full based on the batch constraints. In particular, the deduplication application 182 determines that the number of unique vertices specified in the vertex buffer 992 is less than 4, and the number of graphics primitives specified in the indirect index buffer 994 is less than 4.

Accordingly, the deduplication application 182 iteratively repeats the loading operations 945, the matching operations 950, the mapping operations 960, and the compaction operations 970. As depicted with the bubble numbered 5, the deduplication application 182 executes the loading operations 945(2). For the non-selected threads 910(3)-910(1) the deduplication application 182 loads the vertices specified in the vertex buffer 992. By contrast, for the selected thread 910(0), the deduplication application 182 loads the first unprocessed vertex (789) specified in the index buffer 940.

As depicted with the bubble number 6, the deduplication application 182 then executes the matching operations 950(2) across the threads 910(3)-910(0) based on the MATCH.ANY instruction 920 with the thread 910(0) predicated via the input predicate 912. As depicted in a bold box, the result of the matching operations 950(2) is the indirect index 2, indicating that that the vertex 789 is a duplicate of a previously identified unique vertex.

Subsequently, as depicted with the bubble number 7, the deduplication application 182 executes the mapping operations 960(2) that append the newly identified indirect index 2 to the indirect index buffer 994. In general, as part of the mapping operations 960, the deduplication application 182 also appends any newly identified unique vertices to the vertex buffer 992. However, because there are no newly identified unique vertices, the deduplication application 182 does not modify the vertex buffer 992.

As depicted with the bubble numbered 8, the deduplication application 182 then performs the compaction operations 970(2) that consolidate the unique indices into the threads 910 that correspond to the highest order bits in the match mask 930. As part of the compaction operations 970(2) the deduplication application 182 selects the threads 910 that are not associated with unique vertices, and sets the input predicate 912 to specify the selected threads 910.

Although not depicted, the deduplication application 182 then determines that the shader batch 990 is not yet full based on the batch constraints. In particular, the deduplication application 182 determines that the number of unique vertices specified in the vertex buffer 992 is less than 4, and the number of graphics primitives specified in the indirect index buffer 994 is less than 4.

Accordingly, as depicted with the bubbles numbered 9, 10, 11, and 12, the deduplication application 182 iteratively repeats the loading 945, the matching 950, the mapping operations 960, and the compaction operations 970. Subsequently, because the number of unique vertices specified in the vertex buffer 992 is greater than 4, the deduplication application 182 determines that the shader batch 990 is full.

As depicted by the bubble numbered 13, the deduplication application 182 then performs batching operations 980(1) that generate the shader batch 990. The shader batch 990 includes, without limitation, the vertex buffer 992 and the indirect index buffer 994. The deduplication application 182 then repeats the iterative process that includes the loading operations 945(3), the matching operations 950(3), the mapping operations 960(3), and the compaction operations 970(3) operations to generate new shader batches 990 until the deduplication application 182 has finished processing the index buffer 940.

Note that the techniques described herein are illustrative rather than restrictive, and may be altered without departing from the broader spirit and scope of the invention. Many modifications and variations on the functionality provided by the deduplication application 182 and the MATCH.ANY instruction 920 will be apparent to those of ordinary skill in the art without departing from the scope and spirit of the described embodiments. For instance, in some alternate embodiments, the deduplication application 182 may generate shader batches that include an offset into the indirect index buffer 994 instead of the indirect index buffer 994 and the vertex buffer 990. The offset specifies the start of the portion of the index buffer 940 that is associated with the shader batch 990. In such embodiments, the indirect index buffer 994 and the vertex buffer 992 may be shared between any number of shader batches 990.

In alternate embodiments, the deduplication application 182 implements a non-iterative algorithm to generate the shader batches 990 based on any number of non-predicated MATCH.ANY instructions 920. In operation, the deduplication application 182 selects a multiple M of the thread group size T, and loads the values of (M*T) vertices from the index buffer to (M*T) threads 910. The deduplication application 182 then executes M MATCH.ANY instructions 920, where each MATCH.ANY instruction 920 operates on a different thread group. Subsequently, for each MATCH.ANY instruction 920, the deduplication application 182 identifies a set of unique vertices based on the resulting match masks 930.

After identifying the M sets of unique vertices, the deduplication application 182 compares the total number of vertices specified in the M sets of unique vertices, and the number of associated graphics primitives to determine whether the batch constraints are satisfied. If the batch constraints are satisfied, then the deduplication application 182 generates a single shader batch 990 based on the M sets of unique vertices. If, however, the batch constraints are not satisfied, then the deduplication application 182 partitions the M sets of unique vertices to generate multiple shader batches 990, where each shader batch 990 satisfies the batch constraints. The deduplication application 182 continues in this manner until the deduplication application 182 has processed all of the vertices specified in the index buffer 940.

Advantageously, after the deduplication application 182 generates the shader batches 990, the shader batches 990 may be used to render frames derived from an input mesh until the topology of the input mesh changes. In various embodiments, the user application program 190 determines whether the topology of the input mesh has changed prior to rendering each frame. If the topology of the input mesh has not changed, then the application program 190 reuses the shader batches 990. If, however, the topology of the input mesh has changed, then the application program 190 re-executes the deduplication application 192 to generate new shader batches 990. By contrast, as part of rendering each frame, the primitive distributor re-executes deduplication operations and re-generates batches of work irrespective of whether the topology of the input mesh changes.

Figure 10A:
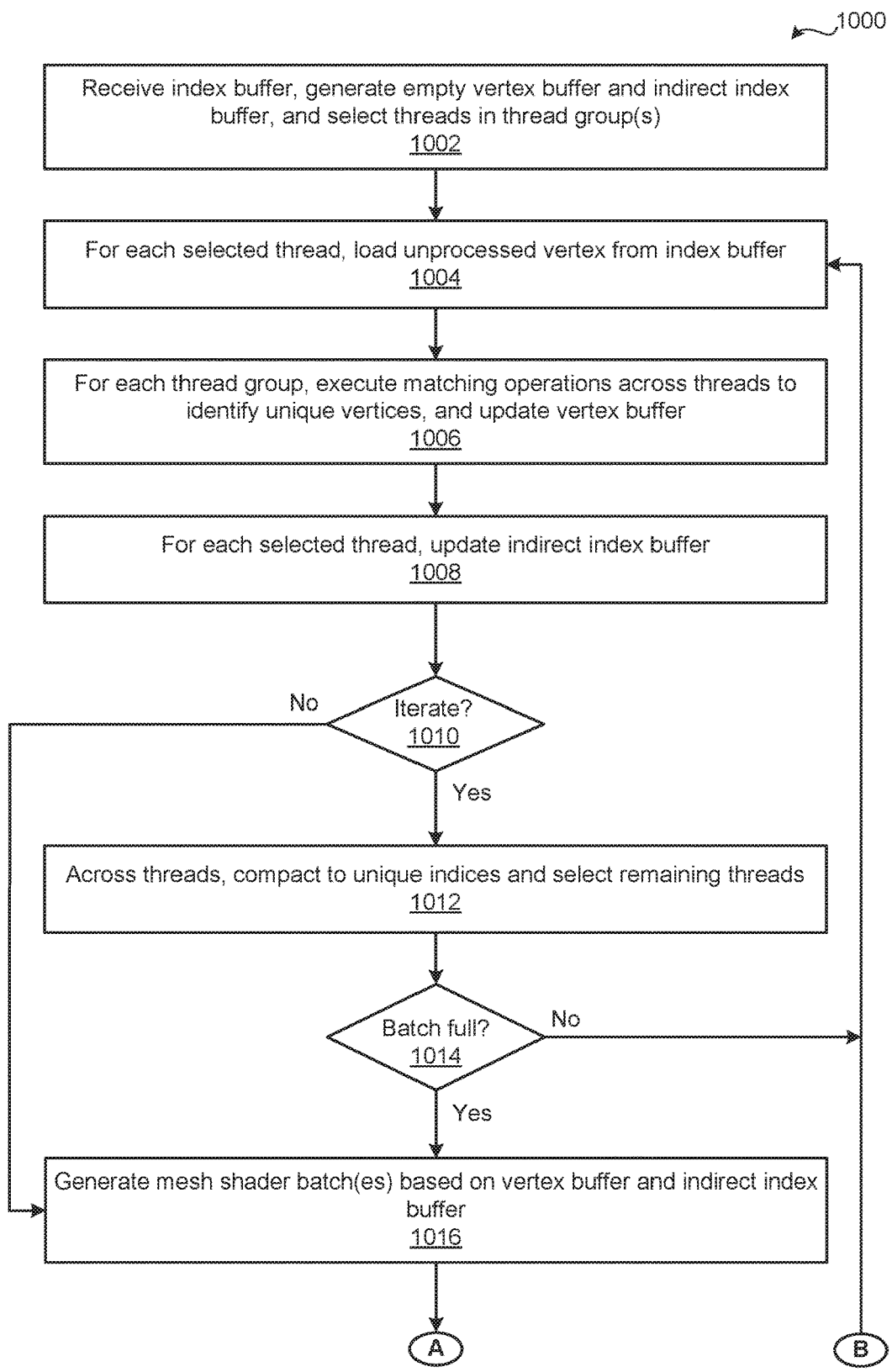
FIGS. 10A-10B set forth a flow diagram of method steps for pre-processing index buffers for use in a graphics processing pipeline, according to various embodiments of the present invention.
Figure 10B:
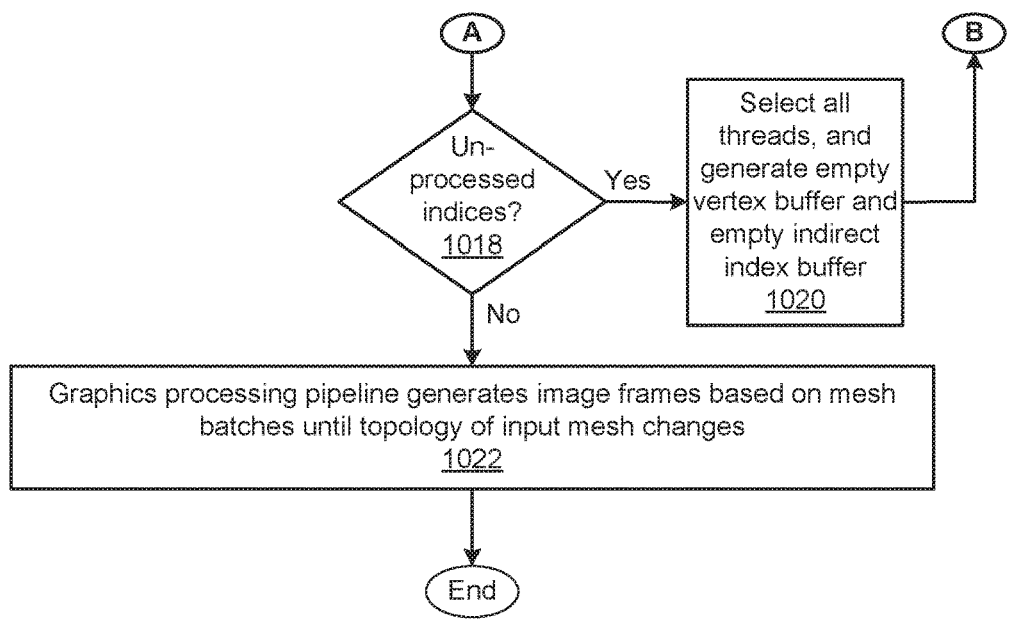

FIGS. 10A-10B set forth a flow diagram of method steps for pre-processing index buffers for use in a graphics processing pipeline, according to various embodiments of the present invention. Although the method steps are described in conjunction with the systems of FIGS. 1-3B and 9, persons skilled in the art will understand that any system configured to perform the method steps, in any order, falls within the scope of the present invention.

As shown, a method 1000 begins at step 1002, where the deduplication application 182 receives the index buffer 940, generates an empty vertex buffer 992 and an empty indirect index buffer 994, and selects the threads 910 included in one or more thread groups. Note that the number of threads 910 included in each thread group matches the number of threads that the MATCH.ANY instruction 920 operates on. If the deduplication application 182 implements an iterative deduplication algorithm, then the deduplication algorithm 182 typically selects the threads 910 included in one thread group. By contrast, if the deduplication application 182 implements an non-iterative deduplication algorithm, then the deduplication algorithm 182 typically selects the threads 910 included in multiple thread groups (e.g., three thread groups) to reduce the likelihood that any of the shader batches 990 are unfilled.

At step 1004, for each selected thread, the deduplication application 182 loads an unprocessed vertex specified in the index buffer 940. At step 1006, for each thread group, the deduplication application 182 executes the matching operations 950 across the selected threads based on the MATCH.ANY instruction 920, where the selected threads are specified in the input predicate 912. For each thread group, the deduplication application 182 then appends the newly identified unique vertices to the vertex buffer 992. At step 1008, for each selected thread 910, the deduplication application 182 appends the corresponding indirect index to the indirect index buffer 994.

At step 1010, the deduplication application 182 determines whether the deduplication application 182 is executing an iterative deduplication algorithm. If, at step 1010, the deduplication application 182 determines that the deduplication application 182 is executing an iterative deduplication algorithm, then the method 1000 proceeds to step 1012.

At step 1012, the deduplication application 182 performs the compaction 970 operations across the thread group. The compaction 970 operations consolidate the indirect indices for the unique vertices into the threads 910 that correspond to the highest order bits in the match mask 930. As part of performing the compaction operations 970, the deduplication application 182 selects the threads 910 that are not associated with unique vertices, and sets the input predicate 912 to specify the selected threads 910.

At step 1014, the deduplication application 182 evaluates the batch constraints to determine whether the batch is full. If, at step 1014, the deduplication application 182 determines that the batch is not full, then the method 100 returns to step 1004, where the deduplication application 182 loads unprocessed vertices from the index buffer into the selected threads 1010. If, however, at step 1014, the deduplication applications 182 determines that the batch is full, then the method 1000 proceeds to step 1016.

Returning now to step 1010, if the deduplication application 182 determines that the deduplication application 182 is not executing an iterative deduplication algorithm, then the method 1000 proceeds directly to step 1016. At step 1016, the deduplication application 182 generates mesh shader batch(es) 990 based on the vertex buffer 992 and the indirect index buffer 994.

At step 1018, the deduplication application 182 determines whether the index buffer 910 includes any unprocessed vertices. If, at step 1018, the deduplication application 182 determines that the index buffer 910 includes unprocessed vertices, then the method 1000 proceeds to step 1020. At step 1020, the deduplication application 182 selects all the threads 910 included in the thread groups, and generates an empty vertex buffer 992 and an empty indirect index buffer 994. The method 1000 then returns to step 1004, where the deduplication application 182 loads unprocessed vertices from the index buffer 940 into the selected threads 910.

If, however, at step 1018, the deduplication application 182 determines that the index buffer 910 does not include any unprocessed vertices, then the method 1000 proceeds directly to step 1022. At step 1022, the graphics processing pipeline 320 or the expanded graphics processing pipeline 620 generates rendered image frames derived from an input mesh associated with the input buffer 940 until a topology of the input mesh changes. The method 1000 then terminates.

In sum, in various embodiments, meshlets are introduced into the graphics processing pipeline to provide a more flexible way to structure and process graphics data generated by different thread groups in the beginning stages of the pipeline. To implement meshlets, the graphics processing pipeline includes a fixed-function hardware mesh shader generator and any number of programmable mesh shaders that replace the primitive distributor, the vertex shading units, and the geometry shading units included in conventional graphics processing pipelines. Each mesh shader comprises a different cooperative thread group that is responsible for processing a different set of verticies included in an input mesh to generate a corresponding meshlet.

In operation, a user application specifies a number of threads included in a thread group comprising a mesh shader and a total number of mesh shaders. The mesh shader generator assigns a different mesh identifier to each of the thread groups, and executes a mesh shading program via the associated thread group. More specifically, as specified by the mesh shading program, each thread group performs read operations on a frame buffer based on the assigned mesh identifier to determine the set of vertices for which the thread group is responsible. Notably, the number of threads included in the thread group is not necessarily equal to the number of vertices included in the set of vertices. Further, each of the threads included in a thread group may communicate with other threads in the thread group. As specified by the mesh shading program, the thread group then performs one or more transformation operations on the set of vertices to generate an associated meshlet. Subsequently, later processing units included in the graphics processing pipeline access the different meshlets to perform graphics, general processing and/or compute operations to generate final output data.

Various embodiments implement an expanded graphics processing pipeline that includes a fixed-function task shader generator and any number of programmable task shaders that execute prior to the fixed-function meshlet generator. In operation, a user application specifies a number of threads included in a cooperative thread group comprising a task shader and a total number of task shaders. The task shader generator assigns a different task identifier to each of the thread groups and executes a task shading program via the associated thread group. Each task shader generates a different task output specifying at least a total number of mesh shaders. For each task output, the mesh shader generator configures the total number of mesh shaders based on a copy of the task output specifying a different mesh shader identifier. Each mesh shader generates a different meshlet based on the task output. Together, the task shader generator, the task shaders, the mesh shader generator, and the mesh shaders replace the primitive distributor, the vertex shaders, the hull shading unit, the tessellator, the domain shading unit and the geometry shading unit included in conventional graphics processing pipelines.

In various embodiments, to improve the performance of the graphics processing pipeline, a user application executes a deduplication application that pre-processes an index buffer associated with the input mesh. The index buffer defines graphics primitives based on vertices. For each mesh shader, the deduplication application identifies a set of unique vertices included in the index buffer via a matching instruction that executes on the parallel processor. The deduplication application then generates a vertex buffer that includes only the set of unique vertices. The vertex buffer defines the vertices for which the mesh shader is responsible. In a complementary fashion, for each vertex buffer, the deduplication application generates a corresponding indirect index buffer that references entries in the vertex buffer to define the graphics primitives associated with the mesh shader. For each frame, if the topology of the input mesh buffer does not change, then the mesh shaders reuse the vertex buffers and the primitive buffers. If, however, the topology of the input mesh does change, then the user application re-executes the deduplication application to pre-process a new index buffer.

Advantageously, because a graphics processing pipeline that includes mesh shaders does not include a primitive distributor, the throughput of the graphics processing pipeline scales based on the memory bandwidth and/or the number of streaming multiprocessors supporting the graphics pipeline. Further, because a mesh shader may process multiple vertices in a cooperative fashion, the graphics processing pipeline may be programmed to perform certain operations (e.g., primitive culling operations) earlier and more efficiently relative to a conventional graphics processing pipeline. Finally, a user application can execute the deduplication application on an index buffer to generate vertex buffers and indirect index buffers that the mesh shaders may reuse until the topology of the input mesh changes. In general, the topology of an input grid changes infrequently. Consequently, reusing the vertex buffers and indirect index buffers eliminates repetitive deduplication operations that waste both processing resources and power in a conventional graphics processing pipeline.

1. In some embodiments, a method for processing image data comprises causing a first plurality of execution threads to execute a shading program on a first plurality of vertices included in a first portion of an input mesh to generate first geometry; causing a second plurality of execution threads to execute the shading program on a second plurality of vertices included in a second portion of the input mesh to generate second geometry; storing the first geometry and the second geometry in an on-chip memory; subsequently reading the first geometry and the second geometry from the on-chip memory; and performing one or more operations on the first geometry and the second geometry to generate a rendered image derived from the input mesh.

2. The method of clause 1, wherein a number of execution threads included in the first plurality of execution threads is not equal to a number of vertices included in the first plurality of vertices.

3. The method of clauses 1 or 2, wherein the first portion of the input mesh includes a first primitive and a second primitive, and causing the first plurality of execution threads to execute the shading program comprises determining that the first primitive is visible with respect to the rendered image and the second primitive is not visible with respect to the rendered image; and specifying the first primitive and not the second primitive in the first geometry.

4. The method of any of clauses 1-3, wherein causing the first plurality of execution threads to execute the shading program on the first plurality of vertices comprises providing a first identifier as an input to the shading program, wherein the first identifier is associated with the first portion of the input mesh.

5. The method of any of clauses 1-4, wherein the first identifier is based on a total number of shaders specified in an application program.

6. The method of any of clauses 1-5, wherein performing the one or more operations on the first geometry and the second geometry comprises determining that the first identifier indicates that the first geometry precedes the second geometry in a pipeline order; and performing one or more rasterization operations on the first geometry prior to performing one or more rasterization operations on the second geometry.

7. The method of any of clauses 1-6, wherein the first geometry is specified in a meshlet structure that includes a primitive topology portion, a per-vertex attributes portion, and a per-primitive attributes portion.

8. The method of any of clauses 1-7, wherein the meshlet structure further includes a meshlet data portion that is associated with the first portion of the input mesh.

9. The method of any of clauses 1-8, wherein the meshlet data portion specifies at least one of a bounding box, an address within a frame buffer, and a characteristic of a tessellation patch.

10. The method of any of clauses 1-9, wherein, when executing the shading program, the first plurality of execution threads performs one or more transformation operations on the first plurality of vertices.

11. The method of any of clauses 1-10, wherein, when executing the shading program, the first plurality of execution threads performs one or more culling operations on a plurality of primitives included in the first portion of the input mesh.

12. The method of any of clauses 1-11, wherein the first plurality of execution threads execute the mesh shading program and the second plurality of execution threads execute the mesh shading program substantially in parallel.

13. In some embodiments, a system comprises an off-chip memory storing a shading application; and a parallel processor that causes a first plurality of execution threads to execute the shading program on a first plurality of vertices included in a first portion of an input mesh to generate first geometry, causes a second plurality of execution threads to execute the shading program on a second plurality of vertices included in a second portion of the input mesh to generate second geometry, stores the first geometry and the second geometry in an on-chip memory, subsequently reads the first geometry and the second geometry from the on-chip memory, and performs one or more operations on the first geometry and the second geometry to generate a rendered image derived from the input mesh.

14. The system of clause 13, wherein a number of execution threads included in the first plurality of execution threads is not equal to a number of vertices included in the first plurality of vertices.

15. The system of clauses 13 or 14, wherein the first portion of the input mesh includes a first primitive and a second primitive, and the parallel processor causes the first plurality of execution threads to execute the shading program by determining that the first primitive is visible with respect to the rendered image and the second primitive is not visible with respect to the rendered image; and specifying the first primitive and not the second primitive in the first geometry.

16. The system of any of clauses 13-15, wherein the first geometry is specified in a meshlet structure that includes a primitive topology portion, a per-vertex attributes portion, and a per-primitive attributes portion.

17. The system of any of clauses 13-16, wherein the primitive topology portion describes a first triangle, and the per-primitive attributes portion specifies at least one of a surface normal, a color, a texture map coordinate associated with the first triangle, and a viewport array mask.

18. The system of any of clauses 13-17, wherein the first geometry describes a third plurality of vertices included in the first portion of the input mesh and a plurality of primitives included in the first portion of the input mesh.

19. The system of any of clauses 13-18, further comprising the processor, prior to reading the first geometry and the second geometry, freeing a first shared buffer that is included in the on-chip memory and is associated with the first plurality of execution threads and a second shared buffer that is included in the on-chip memory and is associated with the second plurality of execution threads.

20. In some embodiments, a method for processing image data comprises causing a first plurality of execution threads to execute a shading program on a first plurality of vertices included in a first portion of an input mesh to generate first geometry, wherein a number of vertices included in the first plurality of vertices is not equal to a number of vertices included in the first geometry; causing a second plurality of execution threads to execute the shading program on a second plurality of vertices included in a second portion of the input mesh to generate second geometry; storing the first geometry and the second geometry in an on-chip memory; subsequently reading the first geometry and the second geometry from the on-chip memory; and performing one or more rasterization operations on the first geometry and the second geometry to generate a rendered image derived from the input mesh.

21. The method of clause 20, wherein, when executing the shading program, the first plurality of execution threads perform a barrier operation that synchronizes the first plurality of execution threads.

22. The method of clauses 20 or 21, wherein, when executing the shading program, a first execution thread included in the first plurality of execution threads writes a first value to a first shared buffer that is included in the on-chip memory, and a second execution thread included in the first plurality of execution threads reads the first value from the first shared buffer.

23. The method of any of clauses 20-22, wherein, when executing the shading program, the first plurality of execution threads execute an instruction that performs one or more operations cooperatively across the first plurality of execution threads without accessing shared memory.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, the various embodiments described herein may be implemented in cloud computing environments, within one or more server machines for purposes of gaming, graphics, video streaming, etc., or any Vehicle Navigation, Infotainment or instrument cluster controller system (e.g., as found in automobiles). The NVIDIA GeForce NOW® is an example of a networked gaming service that can leverage the various embodiments to enhance performance and the overall user experience. The various embodiments also may be implemented in any systems or machines configured for virtual reality applications or for generating output for stereoscopic display.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing image data, the method comprising:
   configuring, by a first stage of a graphics processing pipeline, a plurality of execution threads to process a shader program as different groups of execution threads;
   causing a first group of execution threads to execute, at a second stage of the graphics processing pipeline, the shading program on a first plurality of vertices included in a first portion of an input mesh to generate first geometry;
   causing a second group of execution threads to execute, at the second stage of the graphics processing pipeline, the shading program on a second plurality of vertices included in a second portion of the input mesh to generate second geometry;
   storing the first geometry and the second geometry in an on-chip memory;
   subsequently reading the first geometry and the second geometry from the on-chip memory; and
   performing one or more operations on the first geometry and the second geometry to generate a rendered image derived from the input mesh.

2. The method of claim 1, wherein a number of execution threads included in the first group of execution threads is not equal to a number of vertices included in the first plurality of vertices.

3. The method of claim 1, wherein the first portion of the input mesh includes a first primitive and a second primitive, and causing the first group of execution threads to execute the shading program comprises:
   determining that the first primitive is visible with respect to the rendered image and the second primitive is not visible with respect to the rendered image; and
   specifying the first primitive and not the second primitive in the first geometry.

4. The method of claim 1, wherein causing the first group of execution threads to execute the shading program on the first plurality of vertices comprises providing a first identifier as an input to the shading program, wherein the first identifier is associated with the first portion of the input mesh.

5. The method of claim 4, wherein the first identifier is based on a total number of shaders specified in an application program.

6. The claim 4, wherein performing the one or more operations on the first geometry and the second geometry comprises:
   determining that the first identifier indicates that the first geometry precedes the second geometry in a pipeline order; and performing one or more rasterization operations on the first geometry prior to performing one or more rasterization operations on the second geometry.

7. The method of claim 1, wherein the first geometry is specified in a meshlet structure that includes a primitive topology portion, a per-vertex attributes portion, and a per-primitive attributes portion.

8. The method of claim 7, wherein the meshlet structure further includes a meshlet data portion that is associated with the first portion of the input mesh.

9. The method of claim 8, wherein the meshlet data portion specifies at least one of a bounding box, an address within a frame buffer, and a characteristic of a tessellation patch.

10. The method of claim 1, wherein, when executing the shading program, the first group of execution threads performs one or more transformation operations on the first plurality of vertices.

11. The method of claim 10, wherein, when executing the shading program, the first group of execution threads performs one or more culling operations on a plurality of primitives included in the first portion of the input mesh.

12. The method of claim 1, wherein the first group of execution threads execute the mesh shading program and the second group of execution threads execute the mesh shading program substantially in parallel.

13. A system comprising:
an off-chip memory storing a shading program; and
a parallel processor that:
configures, via a first stage of a graphics processing pipeline, a plurality of execution threads to process the shader program as different groups of execution threads;
causes a first group of execution threads to execute, at a second stage of the graphics processing pipeline, the shading program on a first plurality of vertices included in a first portion of an input mesh to generate first geometry,
causes a second group of execution threads to execute, at the second stage of the graphics processing pipeline, the shading program on a second plurality of vertices included in a second portion of the input mesh to generate second geometry,
stores the first geometry and the second geometry in an on-chip memory,
subsequently reads the first geometry and the second geometry from the on-chip memory, and
performs one or more operations on the first geometry and the second geometry to generate a rendered image derived from the input mesh.

14. The system of claim 13, wherein a number of execution threads included in the first group of execution threads is not equal to a number of vertices included in the first plurality of vertices.

15. The system of claim 13, wherein the first portion of the input mesh includes a first primitive and a second primitive, and the parallel processor causes the first group of execution threads to execute the shading program by:
determining that the first primitive is visible with respect to the rendered image and the second primitive is not visible with respect to the rendered image; and
specifying the first primitive and not the second primitive in the first geometry.

16. The system of claim 13, wherein the first geometry is specified in a meshlet structure that includes a primitive topology portion, a per-vertex attributes portion, and a per-primitive attributes portion.

17. The system of claim 13, wherein the primitive topology portion describes a first triangle, and the per-primitive attributes portion specifies at least one of a surface normal, a color, a texture map coordinate associated with the first triangle, and a viewport array mask.

18. The system of claim 13, wherein the first geometry describes a third plurality of vertices included in the first portion of the input mesh and a plurality of primitives included in the first portion of the input mesh.

19. The system of claim 13, further comprising the processor, prior to reading the first geometry and the second geometry, freeing a first shared buffer that is included in the on-chip memory and is associated with the first group of execution threads and a second shared buffer that is included in the on-chip memory and is associated with the second group of execution threads.

20. A computer-implemented method for processing image data, the method comprising:
configuring, by a first stage of a graphics processing pipeline, a plurality of execution threads to process a shader program as different groups of execution threads;
causing a first group of execution threads to execute, at a second stage of the graphics processing pipeline, the shading program on a first plurality of vertices included in a first portion of an input mesh to generate first geometry, wherein a number of vertices included in the first plurality of vertices is not equal to a number of vertices included in the first geometry;
causing a second group of execution threads to execute, at the second stage of the graphics processing pipeline, the shading program on a second plurality of vertices included in a second portion of the input mesh to generate second geometry;
storing the first geometry and the second geometry in an on-chip memory;
subsequently reading the first geometry and the second geometry from the on-chip memory; and
performing one or more rasterization operations on the first geometry and the second geometry to generate a rendered image derived from the input mesh.

21. The method of claim 20, wherein, when executing the shading program, the first group of execution threads perform a barrier operation that synchronizes the first group of execution threads.

22. The method of claim 20, wherein, when executing the shading program, a first execution thread included in the first group of execution threads writes a first value to a first shared buffer that is included in the on-chip memory, and a second execution thread included in the first group of execution threads reads the first value from the first shared buffer.

23. The method of claim 20, wherein, when executing the shading program, the first group of execution threads execute an instruction that performs one or more operations cooperatively across the first group of execution threads without accessing shared memory.

* * * * *